(12) United States Patent
Tatenuma et al.

(10) Patent No.: US 9,588,323 B2
(45) Date of Patent: Mar. 7, 2017

(54) ZOOM LENS AND IMAGE PICKUP APPARATUS HAVING THE SAME

(71) Applicant: CANON KABUSHIKI KAISHA, Tokyo (JP)

(72) Inventors: Yuki Tatenuma, Utsunomiya (JP); Masakazu Kodaira, Utsunomiya (JP); Takahiro Yoshimi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 14/645,942

(22) Filed: Mar. 12, 2015

(65) Prior Publication Data
US 2015/0268456 A1 Sep. 24, 2015

(30) Foreign Application Priority Data
Mar. 18, 2014 (JP) ................. 2014-054785

(51) Int. Cl.
*G02B 15/17* (2006.01)
*G02B 15/173* (2006.01)
(Continued)

(52) U.S. Cl.
CPC ........... *G02B 15/17* (2013.01); *G02B 15/173* (2013.01); *G02B 15/177* (2013.01); *G02B 15/24* (2013.01); *G02B 15/26* (2013.01); *G02B 15/28* (2013.01)

(58) Field of Classification Search
CPC ...... G02B 15/00; G02B 15/16; G02B 15/163; G02B 15/167; G02B 15/17; G02B 15/173;
(Continued)

(56) References Cited

U.S. PATENT DOCUMENTS

| 5,831,771 A | 11/1998 | Suzuki |
| 6,825,980 B2 | 11/2004 | Dickson et al. |

(Continued)

FOREIGN PATENT DOCUMENTS

| JP | 2010-186179 A | 8/2010 |
| JP | 2013/033242 A | 2/2013 |

OTHER PUBLICATIONS

Warren J. Smith, "Modern Lens Design: A Resource Manual", McGraw-Hill, Inc., 1992, pp. 72-75 (4 pages).
(Continued)

*Primary Examiner* — Bumsuk Won
*Assistant Examiner* — Ephrem Mebrahtu
(74) *Attorney, Agent, or Firm* — Carter, DeLuca, Farrell & Schmidt, LLP

(57) ABSTRACT

The zoom lens according to the present invention includes in order from an object side to an image side: a first lens unit; a second lens unit; a third lens unit; an aperture stop; and a fourth lens unit; wherein a partial dispersion ratio θLm of a material of a positive lens Lm formed of a material having a highest partial dispersion ratio, which is contained in a rear group, a distance d from the aperture stop to an image plane, a distance dLm from the aperture stop to a positive lens Lm, an average value vRfp of Abbe constants of materials of positive lenses contained in a front group, an average value θRfp of partial dispersion ratios thereof, an average value vRfn of Abbe constants of materials of negative lenses contained in the front group, and an average value θRfn of partial dispersion ratios thereof are each appropriately set.

10 Claims, 12 Drawing Sheets

(51) Int. Cl.
*G02B 15/177* (2006.01)
*G02B 15/28* (2006.01)
*G02B 15/26* (2006.01)
*G02B 15/24* (2006.01)

(58) Field of Classification Search
CPC  G02B 15/177; G02B 13/004; G02B 13/0045; G02B 13/009; G02B 15/20; G02B 15/24; G02B 15/26; G02B 15/28
USPC .......................... 359/649–651, 676, 683–690
See application file for complete search history.

(56) References Cited

U.S. PATENT DOCUMENTS

| | | |
|---|---|---|
| 7,885,014 B2 | 2/2011 | Inomoto et al. |
| 2010/0302649 A1 | 12/2010 | Yoshimi et al. |
| 2013/0003189 A1 | 1/2013 | Sanjo et al. |
| 2013/0271643 A1 | 10/2013 | Inomoto |
| 2014/0029112 A1 | 1/2014 | Sanjo |

OTHER PUBLICATIONS

Gross H, "Correction of Aberrations", pp. 268-289 (22 pages). : Jan. 1, 2007.
European Search Report issued in corresponding application No. EP15000687.2 dated Aug. 7, 2015.
Japanese office action issued in corresponding application No. 2014054785 on Dec. 27, 2016.

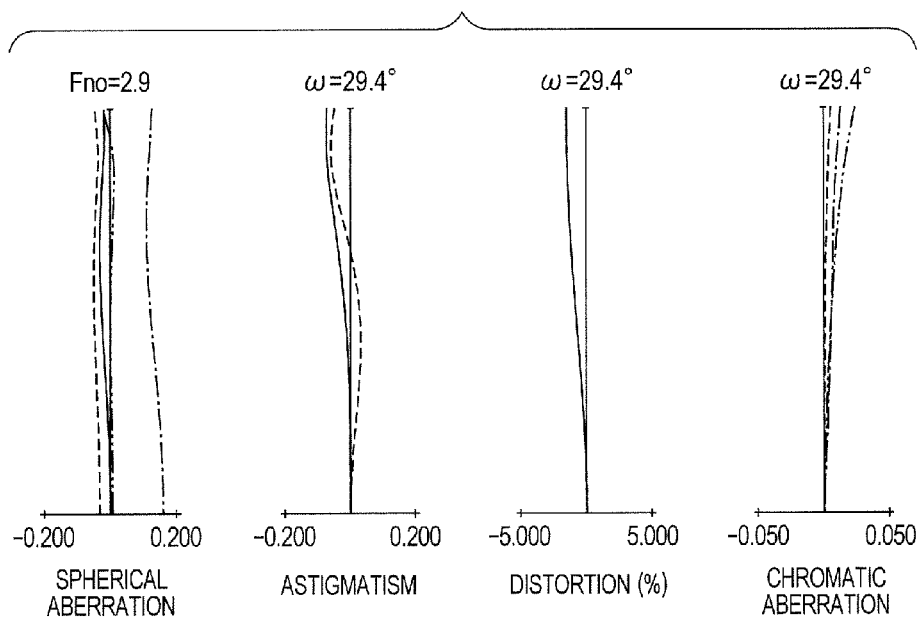
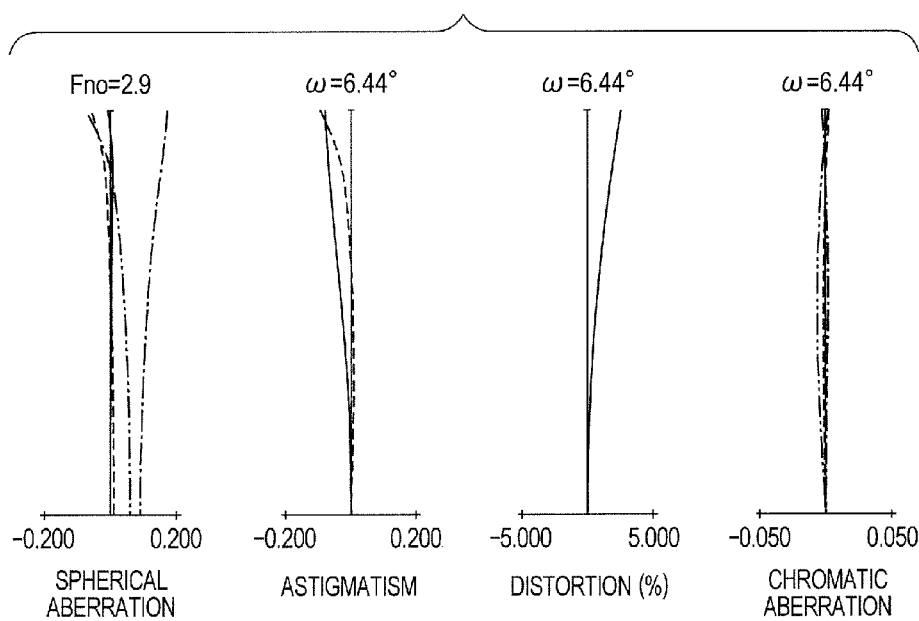

ZOOM LENS AND IMAGE PICKUP APPARATUS HAVING THE SAME

BACKGROUND OF THE INVENTION

Field of the Invention

The present invention relates to a zoom lens and an image pickup apparatus having the same, which are suitable, for instance, for a broadcasting television camera, a video camera, a digital still camera, a silver-halide film camera and the like.

Description of the Related Art

In recent years, an image pickup apparatus such as a television camera, a silver halide film camera, a digital camera and a video camera has been desired to be provided with a zoom lens which has a large aperture ratio, a high zooming ratio, and a high optical performance besides. As for the zoom lens having the large aperture ratio and the high zooming ratio, a positive-lead type of four-unit zoom lens is known which has a lens unit having a positive refractive power arranged in the side closest to the object side and includes four lens units as a whole. As for this four-unit zoom lens, a zoom lens is known which has the following lens units in order from an object side to an image side: a first lens unit for focusing; a second lens unit for zooming, which has a negative refractive power; a third lens unit for correcting the variation of an image plane incident to zooming, which has a positive or negative refractive power; and a fourth lens unit for imaging, which has a positive refractive power.

In this type of four-unit zoom lens, a zoom lens is known which specifies an Abbe constant of a material of a part of the lens in the fourth lens unit, and thereby adequately corrects chromatic aberration, in particular, lateral chromatic aberration, and obtains a high optical performance (U.S. Pat. No. 7,885,014). In addition, in this four-unit zoom lens, a zoom lens is known which employs an optical material having anomalous dispersibility, adequately corrects chromatic aberration, and has a high optical performance and a high zooming ratio (U.S. Pat. No. 5,831,771 and U.S. Pat. No. 6,825,980).

The previously described positive-lead type of the four-unit zoom lens comparatively easily achieves the high zooming ratio. However, when the zoom lens acquires the high zooming ratio, the variation of the various aberrations increases, and it becomes difficult to obtain the high optical performance in an entire zoom range. In particular, chromatic aberration such as the lateral chromatic aberration and axial chromatic aberration occurs in many cases.

In order that the positive-lead type of the four-unit zoom lens adequately corrects the chromatic aberration and obtains the high optical performance while acquiring the high zooming ratio, it is important, for instance, to appropriately set the configuration of the fourth lens unit for imaging. If the configuration of the fourth lens unit is not appropriately set, it becomes difficult to correct the lateral chromatic aberration and the axial chromatic aberration, and to obtain the high zooming ratio and the high optical performance in an entire zoom range.

An object of the present invention is to provide a zoom lens which has a high zooming ratio, adequately corrects chromatic aberration in an entire zoom range from a wide angle end to a telephoto end, and has a high optical performance in the entire zoom range, and to provide an image pickup apparatus having the same.

SUMMARY OF THE INVENTION

A zoom lens of the present invention includes in order from an object side to an image side: a first lens unit having a positive refractive power which does not move for zooming; a second lens unit having a negative refractive power which moves during zooming; a third lens unit having a positive or negative refractive power which moves during zooming; an aperture stop; and a fourth lens unit having a positive refractive power which does not move for zooming, wherein in the fourth lens unit, when an incidence height from an optical axis of an on-axis ray of an i-th lens (thin lens) in paraxial tracking is represented by $h\_i$, an incidence height from an optical axis of an off-axis main light beam of the i-th lens in the paraxial tracking is represented by $h\_bar\_i$, a lens system including a lens face which satisfies a relationship of $$h\_bar\_i/h\_i \leq 0.06,$$

out of lenses in an optical path from the aperture stop to an image plane, is referred to as a front group, and a lens system other than the front group is referred to as a rear group, and when a partial dispersion ratio of a material of a positive lens Lm formed of a material having a highest partial dispersion ratio, which is contained in the rear group, is represented by $\theta Lm$, a distance from the aperture stop to the image plane is represented by d, a distance from the aperture stop to the positive lens Lm is represented by $dLm$, an average value of Abbe constants of materials of positive lenses contained in the front group is represented by $vRfp$, an average value of partial dispersion ratios thereof is represented by $\theta Rfp$, an average value of Abbe constants of materials of negative lenses contained in the front group is represented by $vRfn$, and an average value of partial dispersion ratios thereof is represented by $\theta Rfn$, the zoom lens satisfies following conditional expressions:

$$0.420 < dLm/d < 0.71,$$

$$0.630 < \theta Lm < 0.690, \text{ and}$$

$$2.16 \times 10^{-3} < (\theta Rfn - \theta Rfp)/(vRfp - vRfn) < 3.10 \times 10^{-3}.$$

Further features of the present invention will become apparent from the following description of exemplary embodiments with reference to the attached drawings.

BRIEF DESCRIPTION OF THE DRAWINGS

FIG. 8A illustrates a view of longitudinal aberration when the zoom lens is set at a wide angle end and focuses on a distance of 5 m, in Numeric Example 3.

FIG. 8B illustrates a view of longitudinal aberration when the zoom lens is set at a telephoto end and focuses on the distance of 5 m, in Numeric Example 3.

DESCRIPTION OF THE EMBODIMENTS

Preferred embodiments of the present invention will now be described in detail in accordance with the accompanying drawings.

Embodiments according to the present invention will be described in detail below with reference to the attached drawings. A zoom lens of the present invention includes in order from an object side to an image side: a first lens unit having a positive refractive power which does not move for zooming; a second lens unit having a negative refractive power which moves during zooming; furthermore, a third lens unit having a positive or negative refractive power which moves during zooming; an aperture stop; and a fourth lens unit having a positive refractive power which does not move for zooming.

Figure 1:
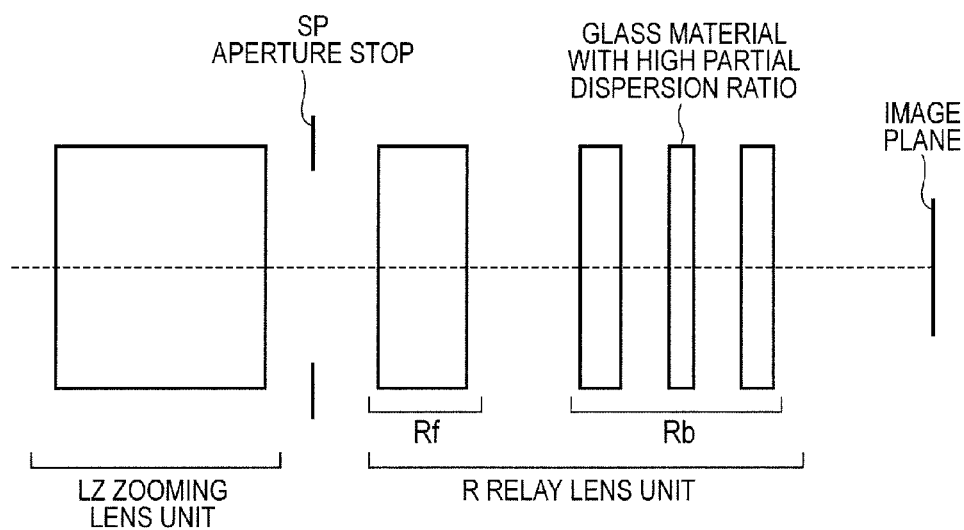
FIG. 1 illustrates a schematic view of a configuration of a zoom lens of the present invention.
Figure 2:
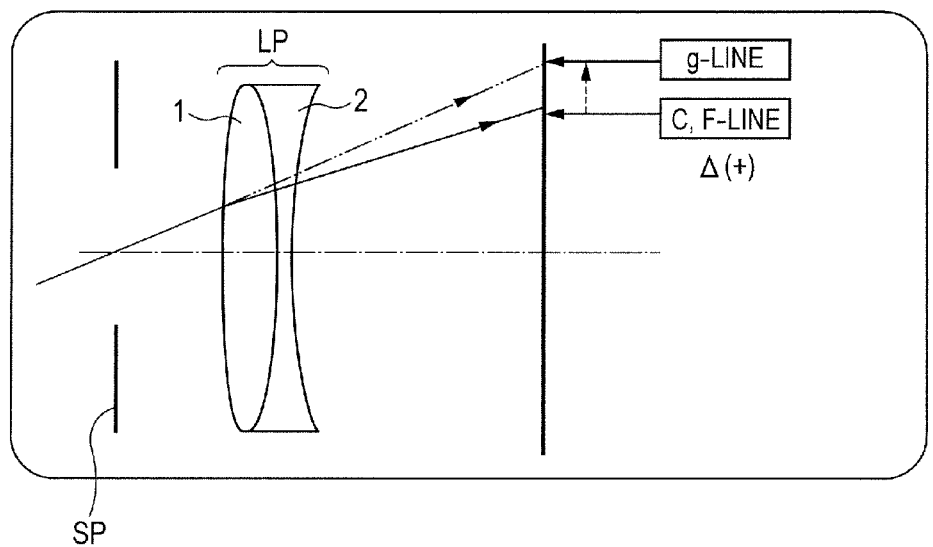
FIG. 2 illustrates an explanatory drawing of a secondary spectrum of lateral chromatic aberration.
Figure 3:
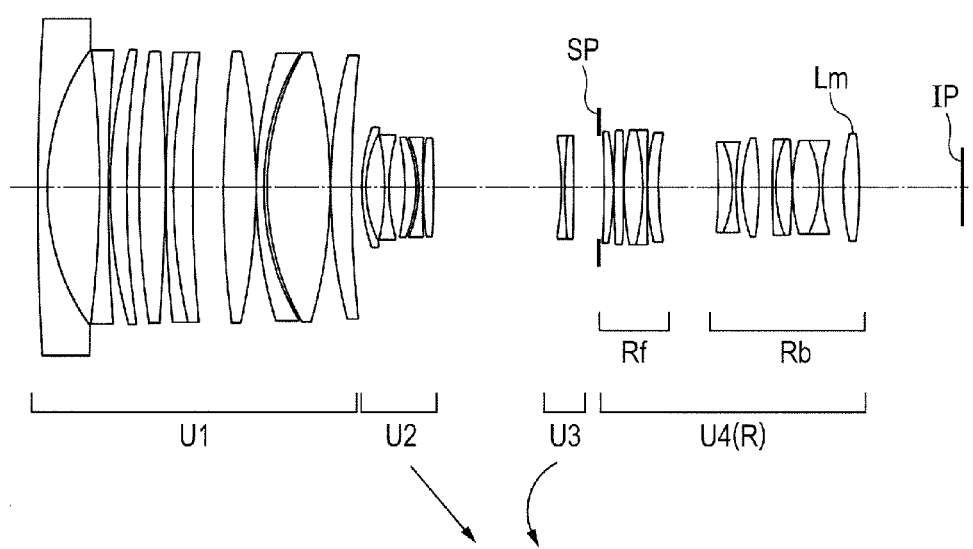
FIG. 3 illustrates a sectional view of lenses when a zoom lens is set at a wide angle end and focuses on infinity, in Exemplary Embodiment 1 of the present invention.
Figure 4A:
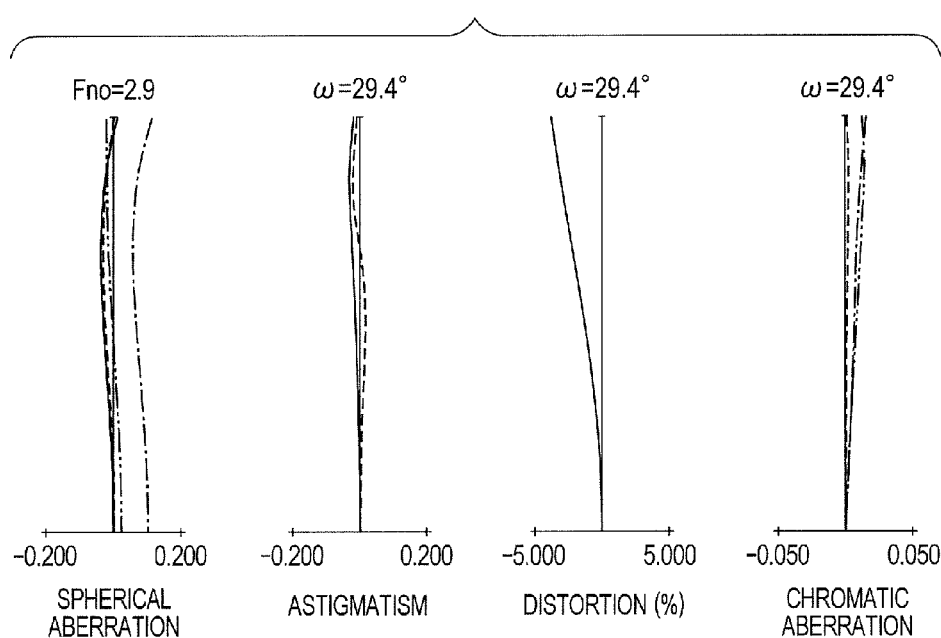
FIG. 4A illustrates a view of longitudinal aberration when a zoom lens is set at a wide angle end and focuses on a distance of 5 m, in Numeric Example 1.
Figure 4B:
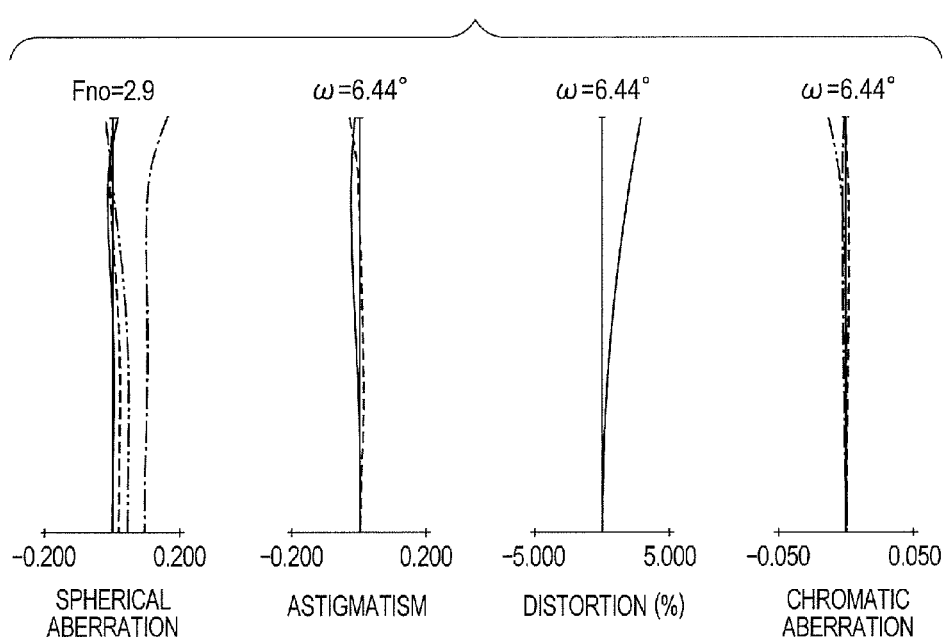
FIG. 4B illustrates a view of longitudinal aberration when the zoom lens is set at a telephoto end and focuses on the distance of 5 m, in Numeric Example 1.

FIG. 1 illustrates a schematic view of a zoom lens of the present invention. FIG. 2 illustrates an explanatory drawing of a secondary spectrum of lateral chromatic aberration. FIG. 3 illustrates a sectional view of lenses when a zoom lens is set at a wide angle end and focuses on infinity, in Exemplary Embodiment 1 (Numeric Example 1) of the present invention. FIGS. 4A and 4B illustrate views of longitudinal aberrations when zoom lenses are set at a wide angle end and a telephoto end, respectively, and focus on a distance of 5 m, in Numeric Example 1. However, a value of an object distance is such a value that a value in the numeric example which will be described later is expressed by a mm unit. The object distance is a distance from a first lens face. The object distances in Exemplary Embodiments 2 to 4 are distances from the first lens face, in the same way as in Exemplary Embodiment 1. In Exemplary Embodiment 5, the object distance is a distance from the image plane.

Figure 5:
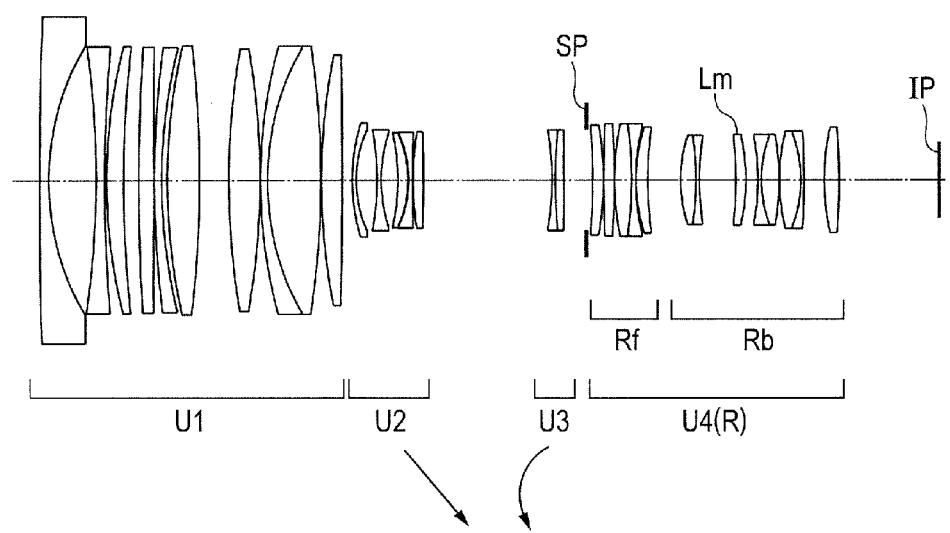
FIG. 5 illustrates a sectional view of lenses when a zoom lens is set at a wide angle end and focuses on infinity, in Exemplary Embodiment 2 of the present invention.
Figure 6A:
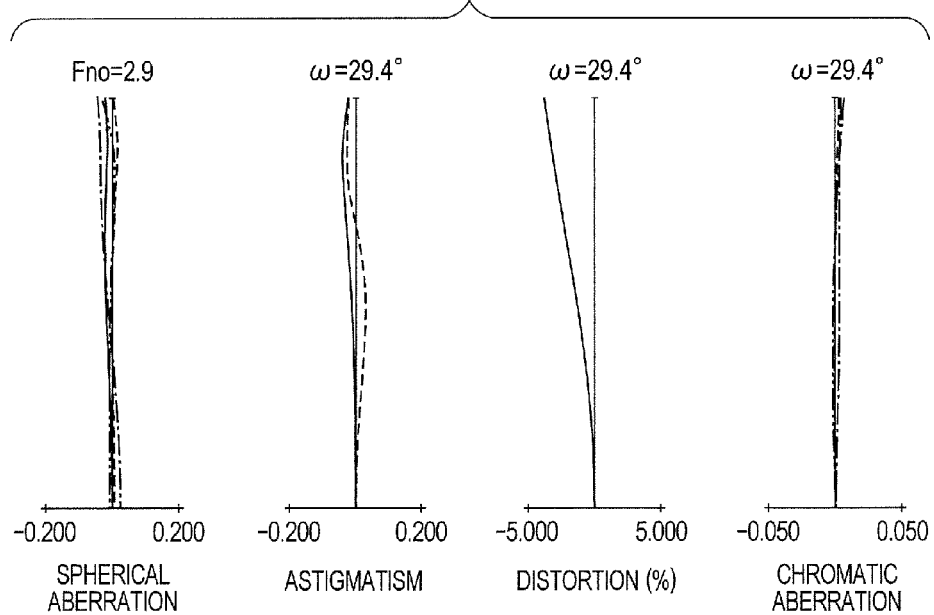
FIG. 6A illustrates a view of longitudinal aberration when the zoom lens is set at a wide angle end and focuses on a distance of 5 m, in Numeric Example 2.
Figure 6B:
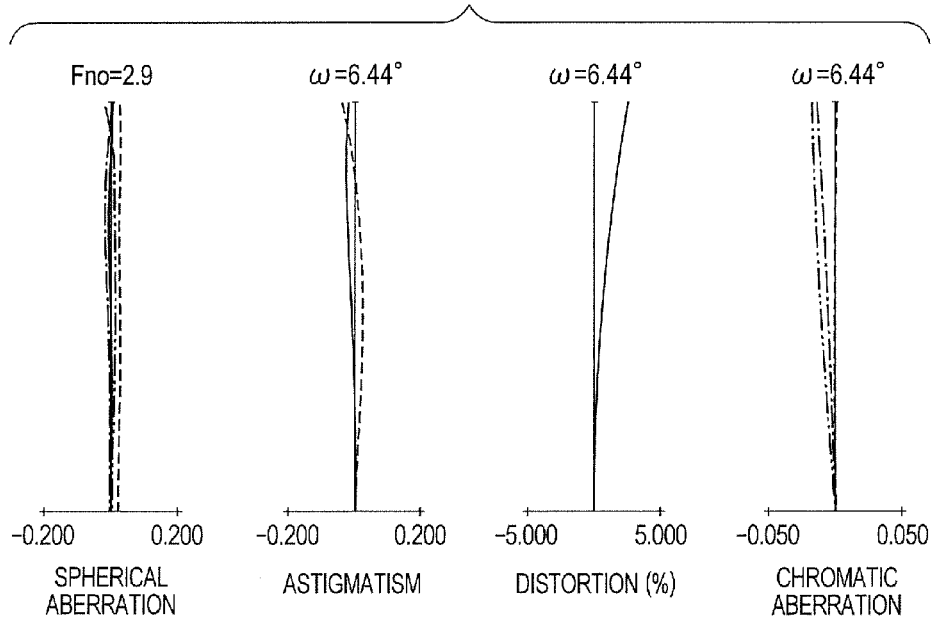
FIG. 6B illustrates a view of longitudinal aberration when the zoom lens is set at a telephoto end and focuses on the distance of 5 m, in Numeric Example 2.
Figure 7:
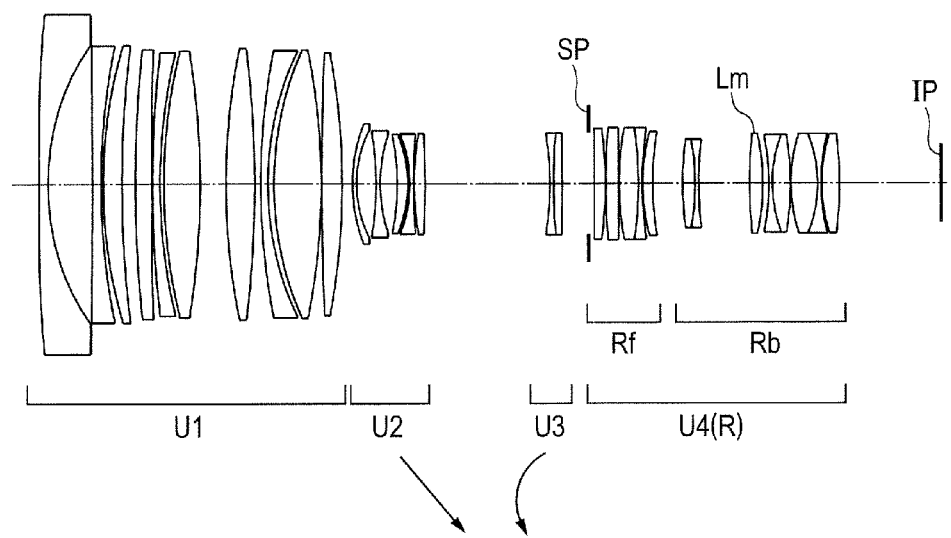
FIG. 7 illustrates a sectional view of lenses when a zoom lens is set at a wide angle end and focuses on infinity, in Exemplary Embodiment 3 of the present invention.

FIG. 5 illustrates a sectional view of lenses when a zoom lens is set at a wide angle end and focuses on infinity, in Exemplary Embodiment 2 (Numeric Example 2) of the present invention. FIGS. 6A and 6B illustrate views of longitudinal aberrations when zoom lenses are set at a wide angle end and a telephoto end, respectively, and focus on a distance of 5 m, in Numeric Example 2. FIG. 7 illustrates a sectional view of lenses when a zoom lens is set at a wide angle end and focuses on infinity, in Exemplary Embodiment 3 (Numeric Example 3) of the present invention. FIGS. 8A and 8B illustrate views of longitudinal aberrations when zoom lenses are set at a wide angle end and a telephoto end, respectively, and focus on a distance of 5 m, in Numeric Example 3.

Figure 9:
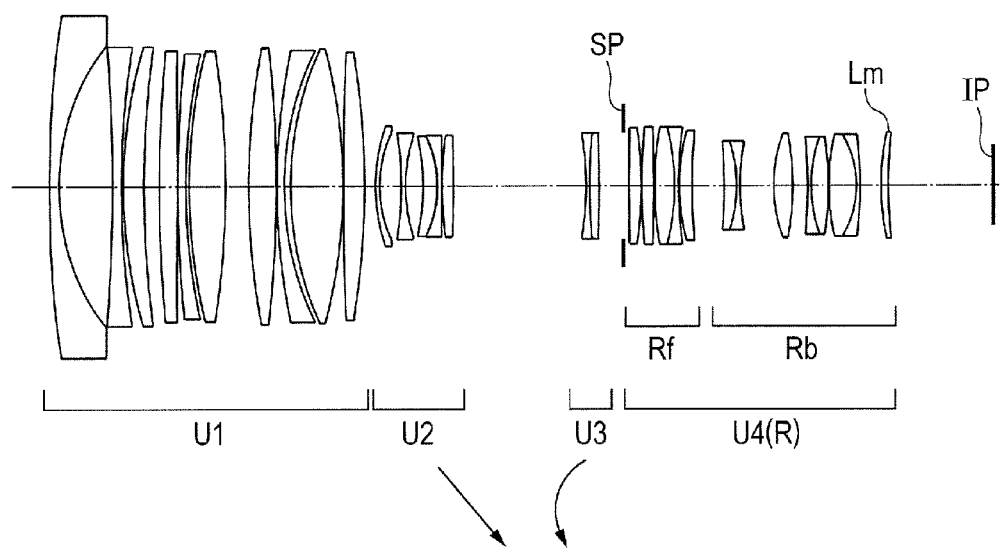
FIG. 9 illustrates a sectional view of lenses when a zoom lens is set at a wide angle end and focuses on infinity, in Exemplary Embodiment 4 of the present invention.
Figure 10A:
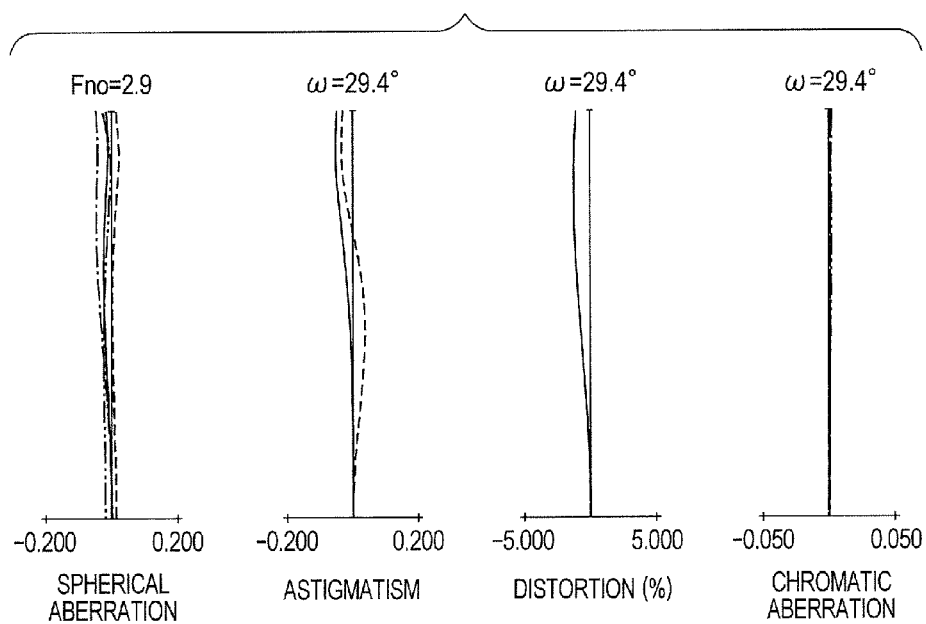
FIG. 10A illustrates a view of longitudinal aberration when the zoom lens is set at a wide angle end and focuses on a distance of 5 m, in Numeric Example 4.
Figure 10B:
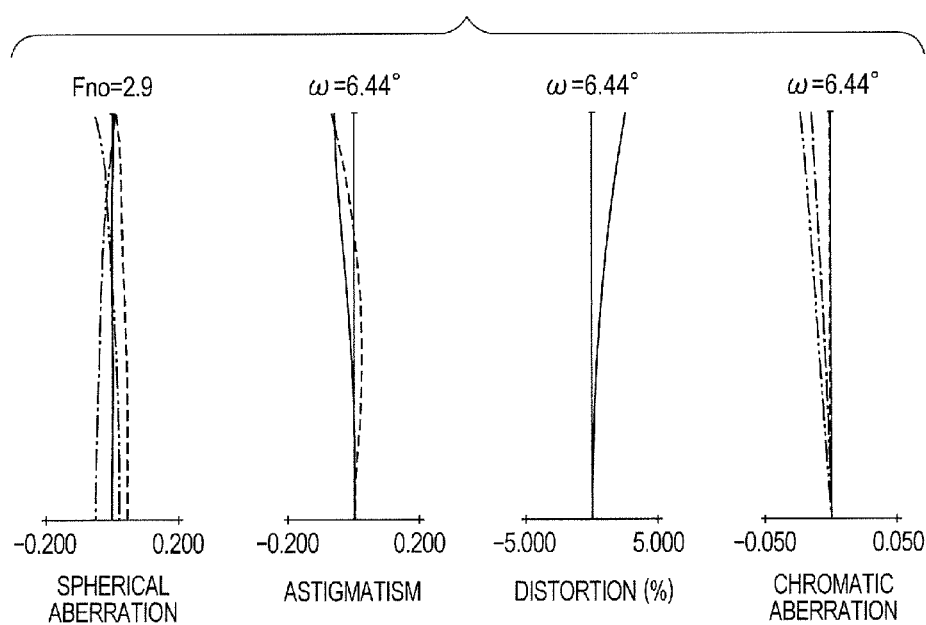
FIG. 10B illustrates a view of longitudinal aberration when the zoom lens is set at a telephoto end and focuses on the distance of 5 m, in Numeric Example 4.
Figure 11:
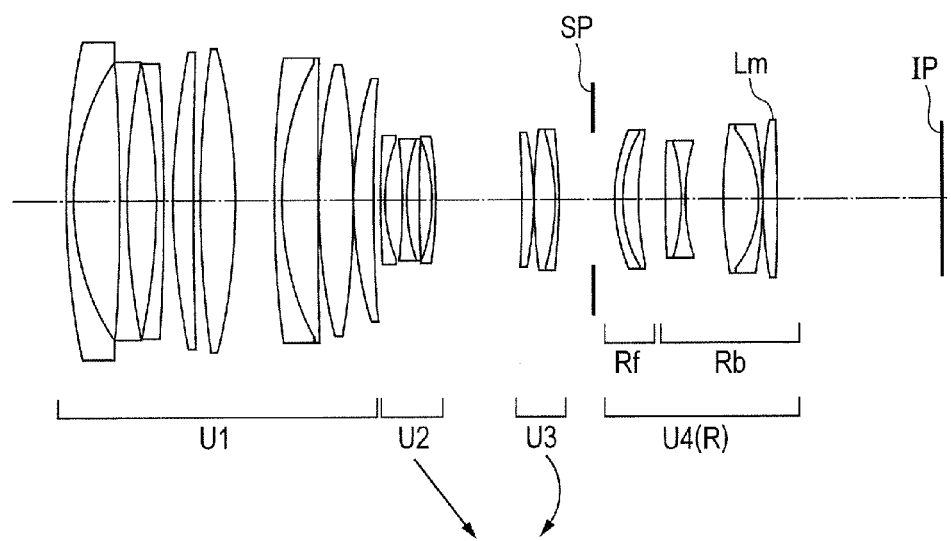
FIG. 11 illustrates a sectional view of lenses when a zoom lens is set at a wide angle end and focuses on infinity, in Exemplary Embodiment 5 of the present invention.
Figure 12A:
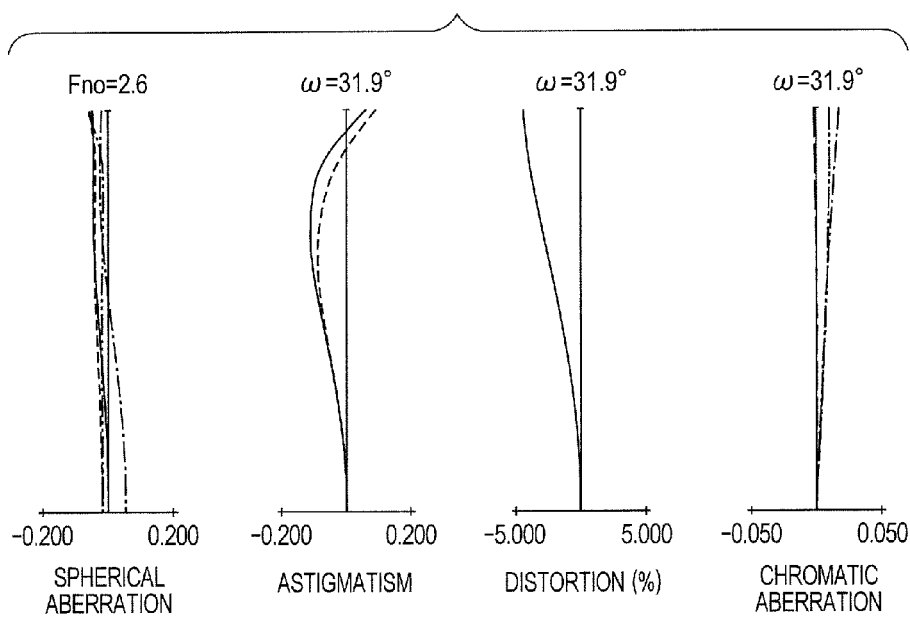
FIG. 12A illustrates a view of longitudinal aberration when the zoom lens is set at a wide angle end and focuses on a distance of 5 m, in Numeric Example 5.
Figure 12B:
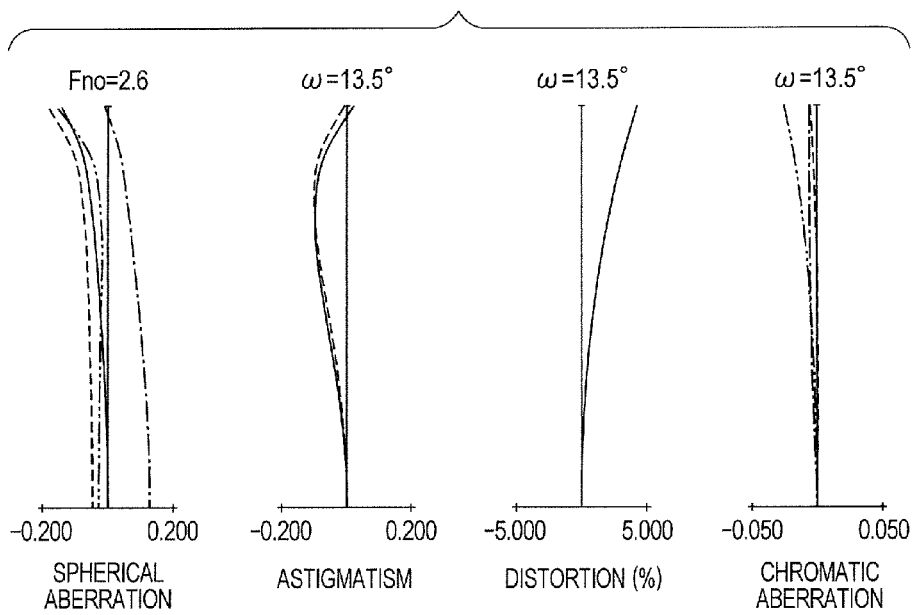
FIG. 12B illustrates a view of longitudinal aberration when the zoom lens is set at a telephoto end and focuses on the distance of 5 m, in Numeric Example 5.
Figure 13:
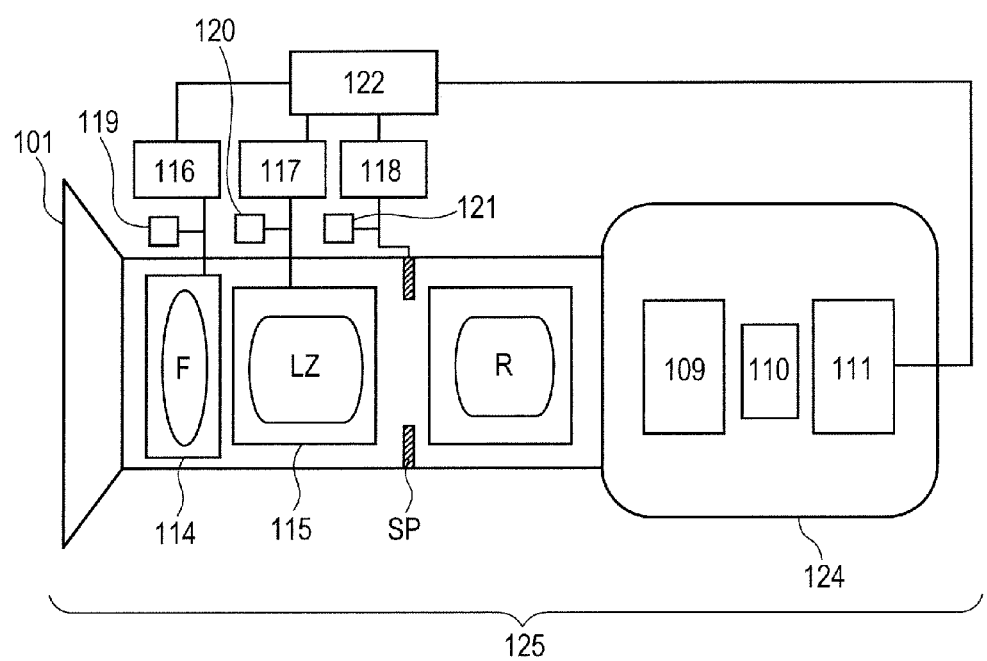
FIG. 13 illustrates a schematic view of an essential part of an image pickup apparatus of the present invention.

FIG. 9 illustrates a sectional view of lenses when a zoom lens is set at a wide angle end and focuses on infinity, in Exemplary Embodiment 4 (Numeric Example 4) of the present invention. FIGS. 10A and 10B illustrate views of longitudinal aberrations when zoom lenses are set at a wide angle end and a telephoto end, respectively, and focus on a distance of 5 m, in Numeric Example 4. FIG. 11 illustrates a sectional view of lenses when a zoom lens is set at a wide angle end and focuses on infinity, in Exemplary Embodiment 5 (Numeric Example 5) of the present invention. FIGS. 12A and 12B illustrate views of longitudinal aberrations when zoom lenses are set at a wide angle end and a telephoto end, respectively, and focus on a distance of 5 m, in Numeric Example 5. FIG. 13 illustrates a schematic view of an essential part of an image pickup apparatus of the present invention.

In the sectional views of the lenses, U1 is a first lens unit having a positive refractive power which does not move during zooming. The first lens unit U1 has a lens system for focusing. The lens system for focusing is formed of a lens system of the whole or a part of the first lens unit U1, which has a refractive power.

U2 represents a second lens unit (variator lens unit) having a negative refractive power which moves during zooming. This second lens unit U2 moves to an image plane side on the optical axis, and thereby performs zooming from the wide angle end to the telephoto end. U3 represents a third lens unit (compensator lens unit) having a negative or positive refractive power which moves during zooming. This third lens unit U3 moves on the optical axis in synchronization with the movement of the second lens unit U2, and corrects the variation of the image plane incident to the zooming. SP represents an aperture stop. U4 represents a fourth lens unit (relay lens unit R) having a positive refractive power which does not move during zooming.

The aperture stop SP is arranged between the third lens unit U3 and the fourth lens unit U4. IP represents an image plane, and corresponds to the image plane of a solid image pickup element (photo-electric conversion element). In the views of the spherical aberration, a solid line shows an e-line, a chain double-dashed line shows a g-line, a chain line shows a C-line, and a dotted line shows an F-line. In the astigmatism, a dotted line shows a meridional image plane of the e-line, and a solid line shows a sagittal image plane of the e-line. In the lateral chromatic aberration, a double-dashed line shows a g-line, a chain line shows a C-line, and a dotted line shows an F-line. Fno represents an F number, and w represents a half angle of view (degree).

In the views of the aberration, the spherical aberration is drawn on a scale of 0.2 mm, the astigmatism is drawn on a scale of 0.2 mm, the distortion is drawn on a scale of 5%, and the lateral chromatic aberration is drawn on a scale of 0.05 mm.

Firstly, the features of the configurations of lenses in the zoom lens in each of the exemplary embodiments will be described below. FIG. 1 is a schematic view illustrating the features of the configuration of the zoom lens in each of the exemplary embodiments. The zoom lens in each of the exemplary embodiments includes in order from an object side to an image side: a zooming lens unit LZ having at least two lens units which move during zooming; an aperture stop SP; and a relay lens unit R having a positive refractive power which does not move for zooming. Here, a zooming portion LZ corresponds to the second lens unit U2 and the third lens unit U3. The relay lens unit R corresponds to the fourth lens unit U4. Incidentally, the relay lens unit R may move in the optical axis direction for macro photographing or flange back adjustment.

The definitions of the front group Rf and the rear group Rb in each of the exemplary embodiments will be described later. An incidence height from an optical axis of an on-axis ray of an i-th lens (thin lens) when having been counted from the object side in paraxial tracking (paraxial light beam tracking) shall be represented by $h\_i$, and an incidence height from an optical axis of an off-axis main light beam of the i-th lens in the paraxial tracking shall be represented by $h\_bar\_i$. In addition, a refractive power of the i-th lens in the paraxial tracking shall be represented by $\phi\_i$, and an Abbe constant of the material of the i-th lens in the paraxial tracking shall be represented by $v\_i$. The paraxial tracking is performed so as to be normalized so that the focal length at the wide angle end of the zoom lens becomes 1.0. The e-line is used as a reference wavelength.

At this time, a coefficient L of axial chromatic aberration of the zoom lens and a coefficient T of lateral chromatic aberration thereof can be expressed as follows:

$$L = \Sigma(h\_i \times h\_i \times \phi\_i / v\_i) \quad \text{(a), and}$$

$$T = \Sigma(h\_i \times h\_bar\_i \times \phi\_i / v\_i) \quad \text{(b).}$$

From Expression (a) and Expression (b), the axial chromatic aberration is proportional to the square of the incidence height $h\_i$, and the lateral chromatic aberration is proportional to the incidence height $h\_i$ and the incidence height $h\_bar\_i$.

The incidence height $h\_bar\_i$ of a lens which is close to the aperture stop SP becomes relatively small, compared to the incidence height $h\_bar$ of a lens which is distant from the aperture stop SP. For this reason, in each of the exemplary embodiments, a lens having a low degree of assignment to correct the lateral chromatic aberration is determined to be a front group Rf, and a lens having a high degree of the assignment is determined to be a rear group Rb, with the use of a ratio between the incidence height $h\_i$ and the incidence height $h\_bar\_i$.

Next, the features of the zoom lens of each of the exemplary embodiments will be described below. In the fourth lens unit U4, the incidence height from the optical axis of the on-axis ray of the i-th lens (thin lens) in the paraxial tracking shall be represented by $h\_i$, and the incidence height from the optical axis of the off-axis main light beam of the i-th lens in the paraxial tracking shall be represented by $h\_bar\_i$. In the fourth lens unit U4 which is positioned in the optical path from the aperture stop SP to the image plane, a lens system including a lens face, which satisfies a relationship of $$h\_bar\_i / h\_i \leq 0.06,$$

shall be determined to be the front group Rf, and a lens system that does not include the lens face, which satisfies the relationship shall be determined to be the rear group Rb.

A positive lens formed of a material having the highest partial dispersion ratio in the rear group Rb shall be determined to be a positive lens Lm. Furthermore, a partial dispersion ratio of the material of the positive lens Lm shall be represented by $\theta Lm$, a distance from the aperture stop SP to the image plane shall be represented by d, and a distance from the aperture stop SP to the positive lens Lm (distance to lens face in object side of positive lens Lm) shall be represented by dLm.

An average value of Abbe constants of materials of positive lenses contained in the front group Rf shall be represented by $vRfp$, and an average value of partial dispersion ratios thereof shall be represented by $\theta Rfp$. An average value of Abbe constants of materials of negative lenses contained in the front group Rf shall be represented by $vRfn$, and an average value of partial dispersion ratios thereof shall be represented by $\theta Rfn$. At this time, the zoom lens satisfies the following conditional expressions:

$$0.420 < dLm/d < 0.710 \quad (1),$$

$$0.630 < \theta Lm < 0.690 \quad (2), \text{ and}$$

$$2.16 \times 10^{-3} < (\theta Rfn - \theta Rfp)/(vRfp - vRfn) < 3.10 \times 10^{-3} \quad (3).$$

By being configured in this way, the zoom lens is obtained which has a high optical performance in the entire zoom range.

The zoom lens of each of the exemplary embodiments can further satisfy one or more of the following conditional expressions, in addition to Conditional Expressions (1) to (3). An average value of Abbe constants of materials of positive lenses other than the positive lens Lm, which are contained in the rear group Rb, shall be represented by $vRbp$, an average value of partial dispersion ratios thereof shall be represented by $\theta Rbp$, an average value of Abbe constants of materials of negative lenses contained in the rear group Rb shall be represented by $vRbn$, and an average value of partial dispersion ratios thereof shall be represented by $\theta Rbn$. The refractive power of the front group Rf shall be represented by $\phi Rf$, and the refractive power of the rear group Rb shall be represented by $\phi Rb$. The refractive power of the positive lens Lm shall be represented by Lm. At this time, the zoom lens can satisfy one or more of the following conditional expressions:

$$2.00 \times 10^{-4} < (\theta Rbn - \theta Rbp)/(vRbp - vRbn) < 1.60 \times 10^{-3} \quad (4),$$

$$0.17 < \phi Rb/\phi Rf < 0.61 \quad (5), \text{ and}$$

$$0.25 < \phi Lm/\phi Rf < 1.20 \quad (6).$$

Here, when the refractive index in the g-line is represented by Ng, the refractive index in the F-line is represented by NF, the refractive index in the d-line is represented by Nd, and the refractive index in the C-line is represented by NC, the Abbe constant $v$ of the material and the partial dispersion ratio $\theta$ satisfy the following relationships:

$$v = (Nd-1)/(NF-NC), \text{ and}$$

$$\theta = (Ng-NF)/(NF-NC).$$

Conditional Expressions (1) to (6) specify the dispersion characteristics, the focal length (refractive power), the optical arrangement and the like of the optical materials in the front group Rf and the rear group Rb. By satisfying these conditional expressions, the zoom lens adequately corrects the secondary spectrum of the lateral chromatic aberration at the wide angle end, and the axial chromatic aberration at the telephoto end, and obtains a high optical performance in the entire zoom range.

The correction of the chromatic aberration in the zoom lenses of each of the exemplary embodiments will be described below. In order to obtain a high optical performance in the entire zoom range of the zoom lens, it becomes important for the zoom lens to adequately correct the lateral chromatic aberration at the wide angle end and the axial chromatic aberration at the telephoto end. In order that the zoom lens adequately corrects the lateral chromatic aberration at the wide angle end and the axial chromatic aberration at the telephoto end, it becomes important for the materials to be appropriately selected and for the number of the lenses to be appropriately set.

Here, the axial chromatic aberration and the lateral chromatic aberration of the F-line with respect to the C-line are defined as the primary spectrum of the axial chromatic aberration, and as the primary spectrum of the lateral chromatic aberration, respectively. In addition, the axial chromatic aberration and the lateral chromatic aberration of the g-line with respect to the F-line, which remain after the respective primary spectra have been corrected to zero, shall be defined as the secondary spectrum of the axial chromatic aberration and the secondary spectrum of the lateral chromatic aberration, respectively. The amount $\Delta f$ of the axial chromatic aberration of the whole lens system and the amount $\Delta Y$ of the lateral chromatic aberration thereof are given by the following Expression (c) and Expression (d):

$$\Delta f = -f \times L \quad \text{(c), and}$$

$$\Delta Y = -Y \times T \quad \text{(d).}$$

However, the focal length of the whole lens system shall be represented by f, and the image height thereof shall be represented by Y. L represents the coefficient of the previously described axial chromatic aberration, and T represents the coefficient of the previously described lateral chromatic aberration.

Now, the partial dispersion Ng-NF of the Abbe constant v_i which is used in Expression (a) and Expression (b) will be considered. Expression (a) and Expression (b) become the coefficients of the chromatic aberration concerning the secondary spectra of the axial chromatic aberration and the lateral chromatic aberration, respectively. Expression (c) and Expression (d) express the amounts of the secondary spectra of the axial chromatic aberration and the lateral chromatic aberration, respectively. From Expression (a) and Expression (c), the assignment value of each of the lenses for the secondary spectrum of the axial chromatic aberration increases in proportion to the square of the incidence height of the on-axis ray, the power of the lens, and a difference between the refractive indices of the g-line and the F-line.

From Expression (b) and Expression (d), the assignment value of each of the lenses for the secondary spectrum of the lateral chromatic aberration increases in proportion to the incidence height of the on-axis ray, the incidence height of the off-axis light beam, the power of the lens, and a difference between the refractive indices of the g-line and the F-line. Furthermore, from Expression (a) and Expression (b), a ratio between the assignment value of each of the lenses for the coefficient of the axial chromatic aberration of the g-line with respect to the F-line and the assignment value of each of the lenses for the coefficient of the lateral chromatic aberration of the g-line with respect to the F-line is determined by a ratio between the incidence height of the on-axis ray and the incidence height of the off-axis light beam. A conventional zoom lens has such a tendency that when the primary spectrum of the lateral chromatic aberration at the wide angle end is set at zero, the secondary spectrum of the lateral chromatic aberration results in remaining in positive direction, as is illustrated in FIG. 2.

In order to correct the secondary spectrum, a lens formed of a material having a large absolute value of the difference between the refractive indices of the g-line and the F-line may be configured so as to have an appropriate power, and be arranged at such a position that the ratio between the incidence height of the on-axis ray and the incidence height of the off-axis light beam is appropriate, in the rear group Rb having a high degree of the assignment to correct the lateral chromatic aberration. Thereby, it is facilitated for the zoom lens to correct the secondary spectrum of the lateral chromatic aberration at the wide angle end. In addition, the front group Rf which is close to the aperture stop SP is configured so as to have an appropriate power by appropriate glass materials, and thereby adequately corrects the secondary spectrum of the axial chromatic aberration in the entire zoom range, and the secondary spectrum of the lateral chromatic aberration at the wide angle end.

The zoom lenses in each of the exemplary embodiments adequately correct the secondary spectrum of the axial chromatic aberration in the entire zoom range, and the secondary spectrum of the lateral chromatic aberration at the wide angle end.

Next, the technical meaning of the previously described conditional expressions will be described. Conditional Expression (1) specifies a range of the arrangement position of the positive lens Lm in the optical path, and thereby specifies a condition for the zoom lens to achieve an adequate optical performance in the entire zoom range. If a value of Conditional Expression (1) exceeds the upper limit, the secondary spectrum of the lateral chromatic aberration is excessively corrected at the wide angle end, and it becomes difficult for the zoom lens to correct the axial chromatic aberration and the lateral chromatic aberration in the entire zoom range in a well-balanced manner.

If the value of Conditional Expression (1) exceeds the lower limit, the secondary spectrum of the lateral chromatic aberration is insufficiently corrected, and it becomes difficult for the zoom lens to adequately correct the chromatic aberration in the entire zoom range. The distance d in Conditional Expression (1) is a distance between the aperture stop and the image plane, which is obtained in the case where a color separation prism, a filter and dummy glass are inserted into the fourth lens unit U4 as glass blocks, by air converting the length of the optical path in which light passes through these glass blocks.

Conditional Expression (2) specifies a range of the partial dispersion ratio of the material of the positive lens Lm, and thereby specifies a condition for the zoom lens to achieve the adequate optical performance in the entire zoom range. If a value of Conditional Expression (2) exceeds the upper limit, the secondary spectrum of the lateral chromatic aberration is excessively corrected at the wide angle end, and it becomes difficult for the zoom lens to correct the axial chromatic aberration and the lateral chromatic aberration in the entire zoom range in a well-balanced manner. If the value of Conditional Expression (2) exceeds the lower limit, the secondary spectrum of the lateral chromatic aberration is insufficiently corrected at the wide angle end, and it becomes difficult for the zoom lens to adequately correct the chromatic aberration in the entire zoom range.

Conditional Expression (3) specifies a range of a ratio between an average value of Abbe constants and an average value of partial dispersion ratios of materials of positive lenses and negative lenses which are contained in the front group Rf, and thereby specifies a condition for the zoom lens to achieve the adequate optical performance in the entire zoom range. If a value of Conditional Expression (3)

exceeds the upper limit, the secondary spectrum of the axial chromatic aberration is insufficiently corrected at the telephoto end, and it becomes difficult for the zoom lens to adequately correct the chromatic aberration in the entire zoom range. If the value of Conditional Expression (3) exceeds the lower limit, the secondary spectrum of the axial chromatic aberration is excessively corrected at the telephoto end, and it becomes difficult for the zoom lens to correct the axial chromatic aberration and the lateral chromatic aberration in the entire zoom range in a well-balanced manner.

Conditional Expression (4) specifies a range of a ratio between an average value of Abbe constants and an average value of partial dispersion ratios of materials of positive lenses other than the positive lens Lm and negative lenses, which are contained in the rear group Rb, and thereby specifies a condition for the zoom lens to appropriately correct the secondary spectrum of the lateral chromatic aberration mainly at the wide angle end. If a value of Conditional Expression (4) exceeds the upper limit, the secondary spectrum of the lateral chromatic aberration is insufficiently corrected at the wide angle end, and it becomes difficult for the zoom lens to adequately correct the chromatic aberration in the entire zoom range. If the value of Conditional Expression (4) exceeds the lower limit, the secondary spectrum of the axial chromatic aberration is excessively corrected at the telephoto end, and it becomes difficult for the zoom lens to correct the axial chromatic aberration and the lateral chromatic aberration in the entire zoom range in a well-balanced manner.

Conditional Expression (5) specifies a range of a ratio between a refractive power of the front group Rf and a refractive power of the rear group Rb, and thereby specifies a condition for the zoom lens to appropriately correct the lateral chromatic aberration at the wide angle end and the axial chromatic aberration at the telephoto end. If a value of Conditional Expression (5) exceeds the upper limit, the secondary spectrum of the lateral chromatic aberration is excessively corrected at the wide angle end, and it becomes difficult for the zoom lens to correct the axial chromatic aberration and the lateral chromatic aberration in the entire zoom range in a well-balanced manner. If the value of Conditional Expression (5) exceeds the lower limit, the secondary spectrum of the axial chromatic aberration is excessively corrected at the telephoto end, and it becomes difficult for the zoom lens to correct the axial chromatic aberration and the lateral chromatic aberration in the entire zoom range in a well-balanced manner.

Conditional Expression (6) specifies a range of a ratio between a refractive power of the positive lens Lm and a refractive power of the front group Rf, and thereby specifies a condition for the zoom lens to adequately correct the lateral chromatic aberration at the wide angle end. If a value of Conditional Expression (6) exceeds the upper limit, the secondary spectrum of the lateral chromatic aberration is excessively corrected at the wide angle end, and it becomes difficult for the zoom lens to correct the axial chromatic aberration and the lateral chromatic aberration in the entire zoom range in a well-balanced manner. If the value of Conditional Expression (6) exceeds the lower limit, the secondary spectrum of the axial chromatic aberration is excessively corrected at the telephoto end, and it becomes difficult for the zoom lens to correct the axial chromatic aberration and the lateral chromatic aberration in the entire zoom range in a well-balanced manner. The range of the numerical values of each of the previously described conditional expressions can be further set in the following way.

$$0.421 < dLm/d < 0.700 \quad (1a)$$

$$0.640 < \theta Lm < 0.673 \quad (2a)$$

$$2.17 \times 10^{-3} < (\theta Rfn - \theta Rfp)/(\nu Rfp - \nu Rfn) < 3.00 \times 10^{-3} \quad (3a)$$

$$3.00 \times 10^{-4} < (\theta Rbn - \theta Rbp)/(\nu Rbp - \nu Rbn) < 1.50 \times 10^{-3} \quad (4a)$$

$$0.18 < \phi Rb/\phi Rf < 0.60 \quad (5a)$$

$$0.30 < \phi Lm/\phi Rf < 1.15 \quad (6a)$$

Next, the features of each of the exemplary embodiments will be described.

[Exemplary Embodiment 1]

In the sectional view of the lenses of Exemplary Embodiment 1 in FIG. 3, a first lens unit U1 does not move during zooming, and has a positive refractive power. The first lens unit U1 moves a lens system of the whole thereof or a part thereof, which has a refractive power, and thereby performs focusing. A second lens unit U2 is a lens unit (variator lens unit) having a negative refractive power which moves during zooming. This second lens unit U2 moves to an image plane side on the optical axis, and thereby performs zooming from the wide angle end to the telephoto end.

A third lens unit U3 is a lens unit (compensator lens unit) having a negative refractive power which moves during zooming. This third lens unit U3 moves on the optical axis to the object side so as to form a convex locus in synchronization with the movement of the second lens unit U2, and corrects the variation of the image plane incident to the zooming. An aperture stop SP is arranged between the third lens unit U3 and the fourth lens unit U4. A fourth lens unit U4 does not move during zooming, and has a positive refractive power for imaging.

Next, the configuration of the lenses of the fourth lens unit U4 in the present exemplary embodiment will be described. The fourth lens unit U4 corresponds to a 34th surface to a 55th surface in Numeric Example 1, and is formed of the front group Rf of the 34th surface to the 42nd surface and the rear group RB of the 43rd surface to the 55th surface. A lens Lm is formed of a material having the highest partial dispersion ratio in the rear group Rb and has a positive refractive power.

The present exemplary embodiment satisfies any conditional expression, thereby adequately corrects the lateral chromatic aberration at the wide angle end, and adequately corrects the axial chromatic aberration in the entire zoom range.

[Exemplary Embodiment 2]

The zoom lens in Exemplary Embodiment 2 in FIG. 5 has the same zoom type as that in Exemplary Embodiment 1, which includes the number of the lens units, the refractive power of each of the lens units, and the movement condition of each of the lens units during zooming.

Next, the configuration of the lenses in the fourth lens unit U4 in the present exemplary embodiment will be described. The fourth lens unit U4 corresponds to a 34th surface to a 55th surface in Numeric Example 2, and is formed of the front group Rf of the 34th surface to the 42nd surface and the rear group RB of the 43rd surface to the 55th surface. The lens Lm is formed of a material having the highest partial dispersion ratio in the rear group Rb and has a positive refractive power.

The present exemplary embodiment satisfies any conditional expression, and thereby shows a similar effect to that in Exemplary Embodiment 1.

[Exemplary Embodiment 3]

The zoom type of Exemplary Embodiment 3 in FIG. 7 is the same as that in Exemplary Embodiment 1.

Next, the configuration of the lenses in the fourth lens unit U4 in the present exemplary embodiment will be described. The fourth lens unit U4 corresponds to a 35th surface to a 56th surface in Numeric Example 3, and is formed of the front group Rf of the 35th surface to the 43rd surface and the rear group RB of the 44th surface to the 56th surface. The lens Lm is formed of a material having the highest partial dispersion ratio in the rear group Rb and has a positive refractive power.

The present exemplary embodiment satisfies any conditional expression, and thereby shows a similar effect to that in Exemplary Embodiment 1.

[Exemplary Embodiment 4]

The zoom type of Exemplary Embodiment 4 in FIG. 9 is the same as that in Exemplary Embodiment 1.

Next, the configuration of the lenses in the fourth lens unit U4 in the present exemplary embodiment will be described. The fourth lens unit U4 corresponds to a 35th surface to a 56th surface in Numeric Example 4, and is formed of the front group Rf of the 35th surface to the 43rd surface and the rear group RB of the 44th surface to the 56th surface. The lens Lm is formed of a material having the highest partial dispersion ratio in the rear group Rb and has a positive refractive power.

The present exemplary embodiment satisfies any conditional expression, and thereby shows a similar effect to that in Exemplary Embodiment 1.

[Exemplary Embodiment 5]

In the sectional view of the lenses of Exemplary Embodiment 5 in FIG. 11, a first lens unit U1 does not move during zooming, and has a positive refractive power. The first lens unit U1 moves a lens system of the whole thereof or a part thereof, which has a refractive power, and thereby performs focusing. The second lens unit U2 is a lens unit (variator lens unit) having a negative refractive power which moves during zooming. This second lens unit U2 moves to an image plane side on the optical axis, and thereby zooms a scene from the wide angle end to the telephoto end.

The third lens unit U3 is a lens unit (compensator lens unit) having a positive refractive power which moves during zooming. This third lens unit U3 moves on the optical axis to the image side so as to form a convex locus in synchronization with the movement of the second lens unit U2, and corrects the variation of the image plane incident to the zooming. An aperture stop SP is arranged between the third lens unit U3 and the fourth lens unit U4. The fourth lens unit U4 does not move during zooming, and has a positive refractive power for imaging.

In Exemplary Embodiment 5, the refractive power of the third lens unit U3 is different from that in Exemplary Embodiment 1. In addition, the movement locus of the third lens unit U3 during zooming in Exemplary Embodiment 5 is also different from that in Exemplary Embodiment 1.

Next, the configuration of the lenses in the fourth lens unit U4 in the present exemplary embodiment will be described. The fourth lens unit U4 corresponds to a 31st surface to a 41st surface in Numeric Example 5, and is formed of the front group Rf of the 31st surface to a 33rd surface and the rear group RB from a 34th surface to the 41st surface. The lens Lm is formed of a material having the highest partial dispersion ratio in the rear group Rb and has a positive refractive power. The present exemplary embodiment satisfies any conditional expression, and shows a similar effect to that in Exemplary Embodiment 1.

In Exemplary Embodiments 1, 4 and 5, the positive lens Lm is a lens which is positioned most closely to the image side among lenses in the rear group Rb.

In Exemplary Embodiments 1 to 4, the front group Rf includes in order from an object side to an image side: a positive lens; a positive lens; a cemented lens of a positive lens and a negative lens which are cemented; and a positive lens. The rear group Rb includes in order from an object side to an image side: a cemented lens of a positive lens and a negative lens which are cemented; a positive lens; a cemented lens of a negative lens and a positive lens which are cemented; a cemented lens of a positive lens and a negative lens which are cemented; and a positive lens.

In Exemplary Embodiment 5, the front group Rf includes a cemented lens of a negative lens and a positive lens which are cemented in order from an object side to an image side. The rear group Rb includes in order from an object side to an image side: a cemented lens of a positive lens and a negative lens which are cemented; a cemented lens of a positive lens and a negative lens which are cemented; and a positive lens.

FIG. 13 illustrates a schematic view of essential parts of an image pickup apparatus 125 (television camera system) which uses a zoom lens of each exemplary embodiment as an image pickup optical system. In FIG. 13, a zoom lens 101 is any one of the zoom lenses in Exemplary Embodiments 1 to 5. A camera body 124 is shown, and the zoom lens 101 is configured so as to be removable from the camera body 124. An image pickup apparatus (image pickup system) 125 is structured by the camera 124 and the zoom lens 101 which is mounted thereon. In addition, the zoom lens 101 and the camera body 124 may also be integrally structured.

The zoom lens 101 has a first lens unit F, a zooming portion LZ, and a relay lens unit P for imaging (fourth lens unit U4). The first lens unit F includes a lens unit for focusing. The zooming portion LZ includes: a second lens unit which moves on the optical axis for zooming; and a third lens unit which moves on the optical axis for correcting the variation of the image plane incident to the zooming. An aperture stop SP is shown.

Driving mechanisms 114 and 115 are a helicoid, a cam or the like, and drive the first lens unit F and the zooming portion LZ in the optical axis direction, respectively. Motors (driving units) 116 to 118 electrically drive the driving mechanisms 114 and 115 and the aperture stop SP. Detectors 119 to 121 are an encoder, a potentiometer, a photosensor or the like, and detect positions of the first lens unit F and the zooming portion LZ on the optical axis, and an aperture diameter of the aperture stop SP.

In the camera body 124, a glass block 109 corresponds to an optical filter and color separation prism in the camera body 124. A solid image pickup element (photo-electric conversion element) 110 is a CCD sensor, a CMOS sensor or the like, and receives light of a subject image that has been formed by the zoom lens 101. In addition, CPUs 111 and 122 control various driving of the camera body 124 and the zoom lens body 101.

Thus, when the zoom lens according to the present invention is applied to a television camera, an image pickup apparatus having a high optical performance is achieved.

Numeric Examples 1 to 5 will be described below which correspond to Exemplary Embodiments 1 to 5 of the present invention, respectively. In each of the numeric examples, an order i of surfaces from the object side is shown, a curvature radius ri of the i-th surface from the object side is shown, a space di between the i-th surface and the (i+1)-th surface both from the object side is shown, and a refractive index ndi and an Abbe constant vdi of an optical member of the i-th surface are shown. A back focus BF is shown. When an optical axis direction is determined to be an X-axis, a direction perpendicular to the optical axis is determined to be an H-axis, a traveling direction of light is determined to be positive, R represents a paraxial radius of curvature, k represents a conic constant, and A4, A6, A8, A10, A12, A14 and A16 each represent an aspherical coefficient, an aspherical surface shape is expressed by the following expression.

$$X = \frac{H^2/R}{1 + \sqrt{1-(1+k)(H/R)^2}} + A4H^4 + A6H^6 + A8H^8 + A10H^{10} + A12H^{12} + A14H^{14} + A16H^{16}$$ [Expression 1]

The aspherical surface shape is expressed by the above expression. In addition, for instance, "e-Z" means "×10$^{-Z}$". A symbol * shows an aspherical surface. Correspondence between each of the exemplary embodiments and the previously described conditional expressions is illustrated in Table 1.

NUMERIC EXAMPLE 1

Unit mm

Surface data

| Surface number | r | d | nd | vd | Effective diameter | Partial dispersion ratio |
|---|---|---|---|---|---|---|
| 1* | 911.475 | 4.5 | 1.7725 | 49.6 | 118.67 | 0.5521 |
| 2 | 70.091 | 25.21 | | | 96.56 | |
| 3 | −298.958 | 4.2 | 1.6516 | 58.5 | 96.01 | 0.5426 |
| 4 | 479.689 | 1 | | | 95.25 | |
| 5 | 139.728 | 7.86 | 1.80809 | 22.8 | 96.27 | 0.6307 |
| 6 | 249.448 | 6.04 | | | 94.9 | |
| 7 | 246.156 | 12.57 | 1.48749 | 70.2 | 95.07 | 0.5300 |
| 8* | −392.58 | 0.2 | | | 94.63 | |
| 9 | 335.038 | 3.7 | 1.801 | 35 | 94.08 | 0.5863 |
| 10 | 167.705 | 9.41 | 1.43875 | 94.9 | 94.23 | 0.5343 |
| 11 | 388.693 | 14.73 | | | 94.39 | |
| 12 | 287.452 | 15.83 | 1.497 | 81.5 | 94.84 | 0.5374 |
| 13 | −167.848 | 0.2 | | | 95.03 | |
| 14 | 126.264 | 3.5 | 1.801 | 35 | 93.59 | 0.5863 |
| 15 | 75.512 | 1.7 | | | 92.55 | |
| 16 | 77.716 | 30.51 | 1.43875 | 94.9 | 93.49 | 0.5343 |
| 17 | −133.309 | 0.2 | | | 94.21 | |
| 18 | 140.368 | 10.02 | 1.618 | 63.3 | 91.96 | 0.5441 |
| 19 | 324.842 | (Variable) | | | 90.96 | |
| 20 | 50.717 | 2 | 1.7725 | 49.6 | 41.93 | 0.5521 |
| 21 | 33.561 | 9.07 | | | 37.69 | |
| 22 | −69.598 | 2 | 1.60311 | 60.6 | 36.44 | 0.5414 |
| 23 | 50.664 | 7.79 | | | 34 | |
| 24 | −63.254 | 5.39 | 1.72047 | 34.7 | 34.25 | 0.5834 |
| 25 | −35.905 | 1.15 | | | 34.73 | |
| 26 | −36.198 | 2 | 1.618 | 63.3 | 34.59 | 0.5441 |
| 27 | 602.025 | 0.2 | | | 34.26 | |
| 28 | 98.362 | 5.22 | 1.72047 | 34.7 | 34.26 | 0.5834 |
| 29 | −203.314 | (Variable) | | | 33.75 | |
| 30 | −80.519 | 1.7 | 1.7725 | 49.6 | 33.78 | 0.5521 |
| 31 | 148.442 | 4.28 | 1.84666 | 23.8 | 35.06 | 0.6205 |
| 32 | −711.419 | (Variable) | | | 35.84 | |
| 33 (Aperture) | ∞ | 2.7 | | | 37.03 | |
| 34 | −276.05 | 4.37 | 1.64 | 60.1 | 37.94 | 0.5370 |
| 35 | −85.467 | 0.2 | | | 38.84 | |
| 36 | 232.219 | 4.85 | 1.64 | 60.1 | 39.6 | 0.5370 |
| 37 | −284.206 | 0.2 | | | 39.84 | |
| 38 | 88.258 | 8.99 | 1.64 | 60.1 | 39.93 | 0.5370 |
| 39 | −67.152 | 1.94 | 1.68893 | 31.1 | 39.32 | 0.6003 |
| 40 | 591.515 | 0.2 | | | 38.6 | |
| 41 | 62.22 | 5.3 | 1.64 | 60.1 | 38.05 | 0.5370 |
| 42 | 84.322 | 28.82 | | | 36.48 | |
| 43 | −187.346 | 6.96 | 1.84666 | 23.8 | 30.22 | 0.6205 |
| 44 | −32.033 | 1.7 | 1.883 | 40.8 | 30.48 | 0.5667 |
| 45 | 76.406 | 2.99 | | | 31.1 | |
| 46 | 40.475 | 8.18 | 1.48749 | 70.2 | 34.02 | 0.5300 |
| 47 | −97.483 | 6.41 | | | 34.14 | |
| 48 | 200.529 | 1.7 | 1.8061 | 33.3 | 33.15 | 0.5881 |
| 49 | 36.319 | 7.79 | 1.48749 | 70.2 | 32.48 | 0.5300 |
| 50 | −146.099 | 0.2 | | | 32.62 | |
| 51 | 42.715 | 12.89 | 1.48749 | 70.2 | 32.44 | 0.5300 |
| 52 | −30.343 | 1.7 | 1.78472 | 25.7 | 30.85 | 0.6161 |
| 53 | 40.764 | 10.04 | | | 30.58 | |
| 54 | 61.976 | 7.88 | 1.80809 | 22.8 | 37.12 | 0.6307 |
| 55 | −119.359 | 50.00 | | | 37.29 | |
| Image plane | ∞ | | | | | |

Aspherical surface data

First surface

K = 0.00000e+000    A4 = 6.74663e−009    A6 = 5.74003e−013
A8 = 4.57795e−015   A10 = −1.21425e−018  A12 = −5.93047e−023
A14 = 3.27904e−026  A16 = 3.01722e−030

Eighth surface

K = 0.00000e+000    A4 = 1.11260e−007    A6 = −2.86288e−012
A8 = 2.20866e−015   A10 = −9.09716e−019  A12 = 5.82976e−023
A14 = 7.08954e−026  A16 = −2.02507e−029

Various data
Zoom ratio 5.00

| | Wide angle | Telephoto |
|---|---|---|
| Focal length | 25.00 | 125.00 |
| F-number | 2.90 | 2.90 |
| Half angle of view (degree) | 29.42 | 6.44 |
| Image height | 14.10 | 14.10 |
| Total lens length | 446.92 | 446.92 |
| BF | 50.00 | 50.00 |
| d19 | 5.03 | 70.53 |
| d29 | 61.57 | 3.16 |
| d32 | 12.12 | 5.02 |

NUMERIC EXAMPLE 2

Unit mm

Surface data

| Surface number | r | d | nd | vd | Effective diameter | Partial dispersion ratio |
|---|---|---|---|---|---|---|
| 1* | 2136.477 | 4.5 | 1.7725 | 49.6 | 118.5 | 0.5521 |
| 2 | 77.102 | 23.58 | | | 96.77 | |
| 3 | −262.316 | 4.2 | 1.6516 | 58.5 | 96.17 | 0.5426 |
| 4 | 438.504 | 1.01 | | | 95.33 | |
| 5 | 151.432 | 8.45 | 1.80809 | 22.8 | 96.3 | 0.6307 |
| 6 | 337.008 | 7.55 | | | 94.97 | |
| 7 | 583.754 | 7.54 | 1.48749 | 70.2 | 95.63 | 0.5300 |
| 8* | −4431.103 | 0.2 | | | 95.48 | |
| 9 | 283.511 | 3.7 | 1.801 | 35 | 95.22 | 0.5863 |
| 10 | 155.095 | 2.76 | | | 94.63 | |
| 11 | 171.345 | 16.14 | 1.43875 | 94.9 | 96.51 | 0.5343 |
| 12 | −324.922 | 14.46 | | | 96.94 | |
| 13 | 210.803 | 15.62 | 1.497 | 81.5 | 93.72 | 0.5374 |

-continued

| Unit mm | | | | | |
|---|---|---|---|---|---|
| 14 | −214.608 | 0.2 | | 94.46 | |
| 15 | 142.109 | 3.5 | 1.801 35 | 96.56 | 0.5863 |
| 16 | 78.336 | 26.7 | 1.43875 94.9 | 94.89 | 0.5343 |
| 17 | −246.585 | 0.2 | | 95.07 | |
| 18 | 179.468 | 10.23 | 1.618 63.3 | 89.87 | 0.5441 |
| 19 | −2023.74 | (Variable) | | 88.35 | |
| 20 | 55.9 | 2 | 1.755 52.3 | 41.08 | 0.5476 |
| 21 | 35.913 | 10.36 | | 36.99 | |
| 22 | −78.256 | 2 | 1.52249 59.8 | 36.27 | 0.5439 |
| 23 | 42.527 | 8.31 | | 33.74 | |
| 24 | −61.363 | 5.1 | 1.72047 34.7 | 33.48 | 0.5834 |
| 25 | −33.049 | 0.31 | | 34.03 | |
| 26 | −32.374 | 2 | 1.618 63.3 | 34.03 | 0.5441 |
| 27 | 870.836 | 0.2 | | 34.43 | |
| 28 | 89.773 | 5.1 | 1.72047 34.7 | 34.6 | 0.5834 |
| 29 | −344.862 | (Variable) | | 34.15 | |
| 30 | −80.267 | 1.7 | 1.7725 49.6 | 34.05 | 0.5521 |
| 31 | 147.54 | 4.34 | 1.84666 23.8 | 35.37 | 0.6205 |
| 32 | −696.469 | (Variable) | | 36.17 | |
| 33 (Aperture) | ∞ | 2.7 | | 37.4 | |
| 34 | −253.572 | 5.35 | 1.79952 42.2 | 38.28 | 0.5672 |
| 35 | −95.73 | 0.2 | | 39.55 | |
| 36 | 280.253 | 5.24 | 1.79952 42.2 | 40.24 | 0.5672 |
| 37 | −345.579 | 0.2 | | 40.48 | |
| 38 | 77.65 | 8.55 | 1.79952 42.2 | 40.55 | 0.5672 |
| 39 | −111.847 | 1.94 | 1.78472 25.7 | 39.61 | 0.6161 |
| 40 | 59.297 | 0.2 | | 38.02 | |
| 41 | 48.516 | 5.89 | 1.79952 42.2 | 38.13 | 0.5672 |
| 42 | 110.671 | 16.33 | | 37.03 | |
| 43 | 40.577 | 7.64 | 1.497 81.5 | 31.81 | 0.5374 |
| 44 | −80.968 | 1.7 | 1.883 40.8 | 31.01 | 0.5667 |
| 45 | 78.43 | 18.22 | | 30.37 | |
| 46 | −121.161 | 5.01 | 2.10205 16.8 | 31.84 | 0.6721 |
| 47 | −55.369 | 6.01 | | 32.51 | |
| 48 | −63.074 | 1.7 | 1.883 40.8 | 30.51 | 0.5667 |
| 49 | 35.155 | 8.86 | 1.497 81.5 | 31.08 | 0.5374 |
| 50 | −69.12 | 0.2 | | 32.33 | |
| 51 | 55.866 | 10.58 | 1.497 81.5 | 33.88 | 0.5374 |
| 52 | −38.265 | 1.7 | 1.883 40.8 | 33.87 | 0.5667 |
| 53 | −200.646 | 10 | | 34.84 | |
| 54 | 65.714 | 7.41 | 1.497 81.5 | 37.81 | 0.5374 |
| 55 | −191.292 | 50.01 | | 37.6 | |
| Image plane | ∞ | | | | |

Aspherical surface data

First surface

K = 0.00000e+000   A4 = 1.35934e-008   A6 = 8.99963e-014
A8 = 4.24102e-015  A10 = −1.29931e-018  A12 = −8.50884e-023
A14 = 5.43011e-026 A16 = 8.15368e-031

Eighth surface

K = 0.00000e+000   A4 = 7.30477e-008   A6 = −1.22157e-011
A8 = 6.15167e-015  A10 = −3.91571e-018  A12 = 1.33529e-021
A14 = −1.55551e-025 A16 = −1.79104e-029

Various data
Zoom ratio 5.00

| | Wide angle | Telephoto |
|---|---|---|
| Focal length | 25.00 | 125.00 |
| F-number | 2.90 | 2.90 |
| Half angle of view (degree) | 29.42 | 6.44 |
| Image height | 14.10 | 14.10 |
| Total lens length | 447.97 | 447.97 |
| BF | 50.01 | 50.01 |
| d19 | 5.02 | 71.06 |
| d29 | 63.88 | 4.28 |
| d32 | 11.46 | 5.02 |

NUMERIC EXAMPLE 3

| Unit mm | | | | | | |
|---|---|---|---|---|---|---|
| Surface data | | | | | | |
| Surface number | r | d | nd | vd | Effective diameter | Partial dispersion ratio |
| 1* | 1979.818 | 4.5 | 1.7725 | 49.6 | 119.42 | 0.5521 |
| 2 | 70.525 | 21.88 | | | 97.35 | |
| 3 | −3055.585 | 4.2 | 1.6516 | 58.5 | 96.81 | 0.5426 |
| 4 | 188.714 | 1.03 | | | 96.01 | |
| 5 | 133.087 | 9.11 | 1.80809 | 22.8 | 97.05 | 0.6307 |
| 6 | 292.822 | 6.7 | | | 95.69 | |
| 7 | 343.324 | 8.22 | 1.48749 | 70.2 | 94.31 | 0.5300 |
| 8* | −1991.554 | 0.2 | | | 93.12 | |
| 9 | 303.045 | 3.7 | 1.801 | 35 | 92.19 | 0.5863 |
| 10 | 152.43 | 1.87 | | | 91.81 | |
| 11 | 150.15 | 17.88 | 1.43875 | 94.9 | 92.8 | 0.5343 |
| 12 | −221.66 | 12.65 | | | 93.25 | |
| 13 | 183.835 | 14.06 | 1.497 | 81.5 | 94.64 | 0.5374 |
| 14 | −295.875 | 3.02 | | | 94.88 | |
| 15 | 189.117 | 3.5 | 1.801 | 35 | 93.4 | 0.5863 |
| 16 | 86.018 | 3.01 | | | 92.39 | |
| 17 | 91.895 | 23.23 | 1.43875 | 94.9 | 93.25 | 0.5343 |
| 18 | −178.243 | 0.2 | | | 93.97 | |
| 19 | 837.656 | 10.02 | 1.618 | 63.3 | 91.74 | 0.5441 |
| 20 | −192.409 | (Variable) | | | 90.89 | |
| 21 | 44.745 | 2 | 1.7725 | 49.6 | 42.07 | 0.5521 |
| 22 | 33.1 | 9.62 | | | 37.84 | |
| 23 | −84.409 | 2 | 1.60311 | 60.6 | 37.08 | 0.5414 |
| 24 | 43.048 | 8.37 | | | 34.3 | |
| 25 | −64.638 | 5.11 | 1.72047 | 34.7 | 34 | 0.5834 |
| 26 | −35.52 | 1 | | | 34.49 | |
| 27 | −35.96 | 2 | 1.618 | 63.3 | 34.49 | 0.5441 |
| 28 | 245.97 | 0.2 | | | 34.77 | |
| 29 | 81.539 | 5.36 | 1.72047 | 34.7 | 34.9 | 0.5834 |
| 30 | −301.495 | (Variable) | | | 34.38 | |
| 31 | −80.318 | 1.7 | 1.7725 | 49.6 | 33.39 | 0.5521 |
| 32 | 147.269 | 4.28 | 1.84666 | 23.8 | 34.64 | 0.6205 |
| 33 | −700.231 | (Variable) | | | 35.41 | |
| 34 (Aperture) | ∞ | 2.7 | | | 36.58 | |
| 35 | −3324.834 | 5.46 | 1.788 | 47.4 | 37.73 | 0.5559 |
| 36 | −112.653 | 0.2 | | | 38.67 | |
| 37 | 170.71 | 6.35 | 1.788 | 47.4 | 39.16 | 0.5559 |
| 38 | −1331.881 | 0.2 | | | 39.11 | |
| 39 | 81.25 | 9.47 | 1.788 | 47.4 | 38.99 | 0.5559 |
| 40 | −107.619 | 1.94 | 1.84666 | 23.8 | 37.67 | 0.6205 |
| 41 | 99.831 | 0.2 | | | 36.51 | |
| 42 | 53.636 | 4.92 | 1.788 | 47.4 | 36.35 | 0.5559 |
| 43 | 80.971 | 14.67 | | | 35.02 | |
| 44 | 81.558 | 6.14 | 1.48749 | 70.2 | 30.72 | 0.5300 |
| 45 | −65.771 | 1.7 | 1.7725 | 49.6 | 29.73 | 0.5521 |
| 46 | 84.473 | 25.14 | | | 28.83 | |
| 47 | 124.257 | 6.57 | 1.80809 | 22.8 | 34.79 | 0.6307 |
| 48 | −61.573 | 2.98 | | | 34.79 | |
| 49 | −66.888 | 1.7 | 1.883 | 40.8 | 33.04 | 0.5667 |
| 50 | 37.054 | 8.97 | 1.48749 | 70.2 | 32.92 | 0.5300 |
| 51 | −75.976 | 0.2 | | | 33.75 | |
| 52 | 44.053 | 13.15 | 1.48749 | 70.2 | 34.66 | 0.5300 |
| 53 | −35.873 | 1.7 | 1.72047 | 34.7 | 33.73 | 0.5834 |
| 54 | 54.692 | 0.19 | | | 33.74 | |
| 55 | 42.881 | 8.83 | 1.48749 | 70.2 | 34.3 | 0.5300 |
| 56 | −107.414 | 50.01 | | | 34.4 | |
| Image plane | ∞ | | | | | |

Aspherical surface data

First surface

K = 0.00000e+000   A4 = 1.24561e-007   A6 = 1.57696e-011
A8 = −7.63400e-015 A10 = 2.60610e-019  A12 = 7.57405e-022
A14 = −2.59399e-025 A16 = 2.88441e-029

-continued

Unit mm

Eighth surface

K = 0.00000e+000  A4 = 2.55069e-007   A6 = -1.06432e-012
A8 = 3.64496e-017  A10 = -1.94551e-018  A12 = 3.73889e-022
A14 = 9.60854e-026  A16 = -3.60450e-029

Various data
Zoom ratio 5.00

|  | Wide angle | Telephoto |
| --- | --- | --- |
| Focal length | 25.00 | 125.00 |
| F-number | 2.90 | 2.90 |
| Half angle of view (degree) | 29.42 | 6.44 |
| Image height | 14.10 | 14.10 |
| Total lens length | 443.38 | 443.38 |
| BF | 50.01 | 50.01 |
| d20 | 5.06 | 69.93 |
| d30 | 61.26 | 4.31 |
| d33 | 13.03 | 5.11 |

NUMERIC EXAMPLE 4

Unit mm

Surface data

| Surface number | r | d | nd | vd | Effective diameter | Partial dispersion ratio |
| --- | --- | --- | --- | --- | --- | --- |
| 1* | 432.767 | 4.5 | 1.7725 | 49.6 | 118.09 | 0.5521 |
| 2 | 65.993 | 25.24 |  |  | 96.34 |  |
| 3 | -495.032 | 4.2 | 1.6516 | 58.5 | 95.71 | 0.5426 |
| 4 | 236.471 | 1.02 |  |  | 94.73 |  |
| 5 | 133.328 | 9.67 | 1.80809 | 22.8 | 95.61 | 0.6307 |
| 6 | 274.368 | 7.29 |  |  | 94.23 |  |
| 7 | 385.042 | 8.55 | 1.51633 | 64.1 | 92.78 | 0.5352 |
| 8* | -892.608 | 0.2 |  |  | 91.43 |  |
| 9 | 343.814 | 3.7 | 1.801 | 35 | 90.66 | 0.5863 |
| 10 | 160.452 | 1.59 |  |  | 90.44 |  |
| 11 | 151.965 | 17.24 | 1.43387 | 95.1 | 91.96 | 0.5373 |
| 12 | -238.649 | 10.92 |  |  | 92.5 |  |
| 13 | 198.14 | 13.14 | 1.497 | 81.5 | 94.37 | 0.5374 |
| 14 | -330.967 | 0.2 |  |  | 94.6 |  |
| 15 | 178.187 | 3.5 | 1.801 | 35 | 93.15 | 0.5863 |
| 16 | 85.369 | 3.02 |  |  | 92.06 |  |
| 17 | 91.222 | 24.71 | 1.43875 | 94.9 | 93.01 | 0.5343 |
| 18 | -145.677 | 0.2 |  |  | 93.69 |  |
| 19 | 836.245 | 10.04 | 1.60311 | 60.6 | 91.52 | 0.5414 |
| 20 | -219.69 | (Variable) |  |  | 90.5 |  |
| 21 | 49.511 | 2 | 1.755 | 52.3 | 41.04 | 0.5476 |
| 22 | 34.913 | 10.16 |  |  | 36.91 |  |
| 23 | -92.615 | 2 | 1.60311 | 60.6 | 36.19 | 0.5414 |
| 24 | 43.519 | 8.36 |  |  | 33.75 |  |
| 25 | -60.23 | 6.55 | 1.72047 | 34.7 | 33.49 | 0.5834 |
| 26 | -32.717 | 0.19 |  |  | 34.04 |  |
| 27 | -32.207 | 2 | 1.618 | 63.3 | 34.04 | 0.5441 |
| 28 | 13059.72 | 0.2 |  |  | 34.45 |  |
| 29 | 92.582 | 5.3 | 1.72047 | 34.7 | 34.61 | 0.5834 |
| 30 | -491.216 | (Variable) |  |  | 34.17 |  |
| 31 | -80.261 | 1.7 | 1.7725 | 49.6 | 33.98 | 0.5521 |
| 32 | 147.719 | 4.33 | 1.84666 | 23.8 | 35.29 | 0.6205 |
| 33 | -695.671 | (Variable) |  |  | 36.09 |  |
| 34 (Aperture) | ∞ | 2.7 |  |  | 37.31 |  |
| 35 | 1031.724 | 5.78 | 1.64 | 60.1 | 38.6 | 0.5370 |
| 36 | -107.504 | 0.2 |  |  | 39.56 |  |
| 37 | 155.82 | 5.82 | 1.64 | 60.1 | 40.15 | 0.5370 |
| 38 | -324.777 | 0.2 |  |  | 40.17 |  |
| 39 | 83.53 | 9.6 | 1.64 | 60.1 | 39.94 | 0.5370 |
| 40 | -62.159 | 1.94 | 1.68893 | 31.1 | 39 | 0.6003 |
| 41 | 124.486 | 0.2 |  |  | 37.66 |  |
| 42 | 54.354 | 6.08 | 1.64 | 60.1 | 37.37 | 0.5370 |
| 43 | 144.925 | 15.22 |  |  | 35.96 |  |
| 44 | -178.238 | 5.85 | 1.80518 | 25.4 | 30.05 | 0.6161 |
| 45 | -39.251 | 1.7 | 1.7725 | 49.6 | 29.47 | 0.5521 |
| 46 | 62.221 | 15.93 |  |  | 28.35 |  |
| 47 | 39.932 | 9.07 | 1.43875 | 94.9 | 35.24 | 0.5343 |
| 48 | -74.677 | 7.02 |  |  | 35.08 |  |
| 49 | -147.149 | 1.7 | 1.883 | 40.8 | 32.6 | 0.5667 |
| 50 | 38.25 | 8.1 | 1.43875 | 94.9 | 32.28 | 0.5343 |
| 51 | -87.205 | 0.2 |  |  | 32.96 |  |
| 52 | 59.175 | 13.12 | 1.43875 | 94.9 | 33.64 | 0.5343 |
| 53 | -27.36 | 1.7 | 1.72047 | 34.7 | 33.28 | 0.5834 |
| 54 | -117.714 | 10 |  |  | 34.43 |  |
| 55 | 68.728 | 3.35 | 2.10205 | 16.8 | 35.98 | 0.6721 |
| 56 | 117.289 | 50.00 |  |  | 35.44 |  |
| Image plane | ∞ |  |  |  |  |  |

Aspherical surface data

First surface

K = 0.00000e+000  A4 = 8.18134e-008   A6 = 1.83903e-011
A8 = -3.29387e-015  A10 = -1.22476e-018  A12 = 8.25305e-022
A14 = -2.16062e-025  A16 = 2.41031e-029

Eighth surface

K = 0.00000e+000  A4 = 2.38793e-007   A6 = -1.45251e-012
A8 = 1.91563e-015  A10 = -2.50886e-018  A12 = 2.46860e-022
A14 = 2.57993e-025  A16 = -7.69453e-029

Various data
Zoom ratio 5.00

|  | Wide angle | Telephoto |
| --- | --- | --- |
| Focal length | 25.00 | 125.00 |
| F-number | 2.90 | 2.90 |
| Half angle of view (degree) | 29.42 | 6.44 |
| Image height | 14.10 | 14.10 |
| Total lens length | 446.86 | 446.86 |
| BF | 50.00 | 50.00 |
| d20 | 5.09 | 70.95 |
| d30 | 62.90 | 3.69 |
| d33 | 11.67 | 5.02 |

NUMERIC EXAMPLE 5

Unit mm

Surface data

| Surface number | r | d | nd | vd | Effective diameter | Partial dispersion ratio |
| --- | --- | --- | --- | --- | --- | --- |
| 1 | 113.355 | 2.1 | 1.7725 | 49.6 | 62.1 | 0.5521 |
| 2 | 41.229 | 12.23 |  |  | 54.44 |  |
| 3 | -380.228 | 2 | 1.58913 | 61.1 | 54 | 0.5406 |
| 4 | 98.397 | 7.84 |  |  | 52.59 |  |
| 5 | -92.869 | 2 | 1.58913 | 61.1 | 52.58 | 0.5406 |
| 6 | -316.725 | 2.5 |  |  | 53.54 |  |
| 7 | 105.425 | 5.55 | 1.80518 | 25.4 | 55.19 | 0.6161 |
| 8 | 825.973 | 1.72 |  |  | 54.91 |  |
| 9 | 160.201 | 9.38 | 1.497 | 81.5 | 54.33 | 0.5374 |
| 10 | -97.051 | 10.36 |  |  | 53.59 |  |
| 11 | 161.984 | 2 | 1.80518 | 25.4 | 42.99 | 0.6161 |
| 12 | 47.482 | 9.7 | 1.497 | 81.5 | 40.74 | 0.5374 |
| 13 | 969.234 | 0.15 |  |  | 41.39 |  |
| 14 | 86.414 | 9.28 | 1.48749 | 70.2 | 41.9 | 0.5300 |
| 15 | -126.274 | 0.15 |  |  | 41.76 |  |

-continued

Unit mm

| | | | | | |
|---|---|---|---|---|---|
| 16 | 64.28 | 5.18 | 1.72916 54.7 | 40.67 | 0.5444 |
| 17 | 214.49 | (Variable) | | 39.55 | |
| 18 | 154.05 | 1.15 | 1.7725 49.6 | 24.57 | 0.5521 |
| 19 | 25.902 | 4.65 | | 22.57 | |
| 20 | −76.39 | 1.08 | 1.58913 61.1 | 22.64 | 0.5406 |
| 21 | 29.222 | 3.46 | 1.84666 23.8 | 23.28 | 0.6034 |
| 22 | 233.703 | 3.4 | | 23.28 | |
| 23 | −27.396 | 1 | 1.58913 61.1 | 23.32 | 0.5406 |
| 24 | −58.095 | (Variable) | | 24.24 | |
| 25 | −143.825 | 3.02 | 1.58913 61.1 | 25.12 | 0.5406 |
| 26 | −52.506 | 0.1 | | 25.71 | |
| 27 | 70.738 | 5.75 | 1.497 81.5 | 26.25 | 0.5374 |
| 28 | −35.435 | 1.08 | 1.834 37.2 | 26.24 | 0.5775 |
| 29 | −82.654 | (Variable) | | 26.59 | |
| 30 (Aperture) | ∞ | 5.95 | | 26.48 | |
| 31 | 27.697 | 2 | 1.80518 25.4 | 26.36 | 0.6161 |
| 32 | 21.684 | 4.2 | 1.7725 49.6 | 25.09 | 0.5521 |
| 33 | 44.777 | 7.29 | | 24.23 | |
| 34 | 232.449 | 4.34 | 1.84666 23.8 | 22 | 0.6205 |
| 35 | −30.181 | 1.04 | 1.72047 34.7 | 21.49 | 0.5834 |
| 36 | 31.827 | 10 | | 19.97 | |
| 37 | 52.921 | 9.61 | 1.497 81.5 | 19.1 | 0.5374 |
| 38 | −18.447 | 1.04 | 1.84666 23.8 | 17.91 | 0.6205 |
| 39 | −57.128 | 0.2 | | 18.8 | |
| 40 | 76.756 | 3.87 | 1.80809 22.8 | 19.68 | 0.6307 |
| 41 | −306.05 | 43.99 | | 20.21 | |
| Image plane | ∞ | | | | |

Various data
Zoom ratio 2.60

| | Wide angle | Telephoto |
|---|---|---|
| Focal length | 25.00 | 65.00 |
| F-number | 2.60 | 2.60 |
| Half angle of view (degree) | 31.88 | 13.45 |
| Image height | 15.55 | 15.55 |
| Total lens length | 234.51 | 234.51 |
| BF | 43.99 | 43.99 |
| d17 | 2.00 | 28.40 |
| d24 | 23.15 | 1.50 |
| d29 | 9.00 | 4.25 |

TABLE 1

| | Exemplary Embodiment 1 | Exemplary Embodiment 2 | Exemplary Embodiment 3 | Exemplary Embodiment 4 | Exemplary Embodiment 5 |
|---|---|---|---|---|---|
| Conditional Expression 1 | 0.671 | 0.422 | 0.456 | 0.696 | 0.488 |
| Conditional Expression 2 | 0.631 | 0.672 | 0.631 | 0.672 | 0.631 |
| Conditional Expression 3 | 2.18E−03 | 2.96E−03 | 2.74E−03 | 2.18E−03 | 2.65E−03 |
| Conditional Expression 4 | 1.48E−03 | 7.18E−04 | 1.31E−03 | 3.53E−04 | 9.82E−04 |
| Conditional Expression 5 | 0.34 | 0.37 | 0.29 | 0.19 | 0.57 |
| Conditional Expression 6 | 1.05 | 0.64 | 1.05 | 0.33 | 1.10 |

The present invention provides a zoom lens which has a high zooming ratio, adequately corrects chromatic aberration in an entire zoom range from a wide angle end to a telephoto end, and has a high optical performance in the entire zoom range; and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-054785, filed Mar. 18, 2014, which is hereby incorporated by reference herein in its entirety.

What is claimed is:

1. A zoom lens comprising in order from an object side to an image side:

a first lens unit having a positive refractive power which does not move for zooming;

a second lens unit having a negative refractive power which moves during zooming;

a third lens unit having a positive or negative refractive power which moves during zooming; an aperture stop; and a fourth lens unit having a positive refractive power which does not move for zooming, wherein, in the fourth lens unit, a front group is a lens system including a lens face which satisfies a relationship of $$h\_bar\_i/h\_i \leq 0.06,$$

among lenses in an optical path from the aperture stop to an image plane, and a rear group is a lens system other than the lens system of the front group, where $h\_i$ is an incidence height from an optical axis of an on-axis ray of an i-th lens, which is a thin lens, in paraxial tracking and $h\_bar\_i$ is an incidence height from an optical axis of an off-axis main light beam of the i-th lens in the paraxial tracking, and wherein the zoom lens satisfies the following conditional expressions:

$$0.420 < dLm/d < 0.710,$$

$$0.630 < \theta Lm < 0.690,$$

$$2.16 \times 10^{-3} < (\theta Rfn - \theta Rfp)/(\nu Rfp - \nu Rfn) < 3.10 \times 10^{-3}, \text{ and}$$

$$0.17 < \phi Rb/\phi Rf < 0.61,$$

where a partial dispersion ratio of a material of a positive lens Lm formed of a material having a highest partial dispersion ratio, which is contained in the rear group, is represented by θLm, a distance from the aperture stop to the image plane is represented by d, a distance from the aperture stop to the positive lens Lm is represented by dLm, an average value of Abbe constants of materials of positive lenses contained in the front group is represented by vRfp, an average value of partial dispersion ratios thereof is represented by θRfp, an average value of Abbe constants of materials of negative lenses contained in the front group is represented by vRfn, an average value of partial dispersion ratios thereof is represented by θRfn, a refractive power of the front group is represented by φRf, and a refractive power of the rear group is represented by φRb.

2. The zoom lens according to claim 1, wherein the zoom lens satisfies the following conditional expression:

$$2.00 \times 10^{-4} < (\theta Rbn - \theta Rbp) / (vRbp - vRbn) < 1.60 \times 10^{-3},$$

where an average value of Abbe constants of materials of positive lenses other than the positive lens Lm, which are contained in the rear group, is represented by vRbp, an average value of partial dispersion ratios thereof is represented by θRbp, an average value of Abbe constants of materials of negative lenses contained in the rear group is represented by vRbn, and an average value of partial dispersion ratios thereof is represented by θRbn.

3. The zoom lens according to claim 1, wherein the zoom lens satisfies the following conditional expression:

$$0.25 < \phi Lm/\phi Rf < 1.20,$$

where a refractive power of the front group is represented by φRf, and a refractive power of the positive lens Lm is represented by φLm.

4. The zoom lens according to claim 1, wherein the first lens unit has a lens system for focusing.

5. The zoom lens according to claim 1, wherein the positive lens Lm is positioned most closely to the image side among lenses in the rear group.

6. The zoom lens according to claim 1, wherein
the front group comprises in order from the object side to the image side:
  a positive lens;
  a positive lens;
  a cemented lens of a positive lens and a negative lens which are cemented; and
  a positive lens, and
the rear group comprises in order from the object side to the image side:
  a cemented lens of a positive lens and a negative lens which are cemented;
  a positive lens;
  a cemented lens of a negative lens and a positive lens which are cemented;
  a cemented lens of a positive lens and a negative lens which are cemented; and
  a positive lens.

7. The zoom lens according to claim 1, wherein
the front group comprises a cemented lens of a negative lens and a positive lens which are cemented in order from the object side to the image side, and
the rear group comprises in order from the object side to the image side:
  a cemented lens of a positive lens and a negative lens which are cemented;
  a cemented lens of a positive lens and a negative lens which are cemented; and
  a positive lens.

8. The zoom lens according to claim 1, wherein the second lens unit moves to the image side, and the third lens unit moves to the object side so as to form a convex locus, during zooming from a wide angle end to a telephoto end.

9. The zoom lens according to claim 1, wherein the second lens unit moves to the image side, and the third lens unit moves to the image side so as to form a convex locus, during zooming from a wide angle end to a telephoto end.

10. An image pickup apparatus comprising a zoom lens, wherein the zoom lens comprises in order from an object side to an image side:
  a first lens unit having a positive refractive power which does not move for zooming;
  a second lens unit having a negative refractive power which moves during zooming;
  a third lens unit having a positive or negative refractive power which moves during zooming;
  an aperture stop; and
  a fourth lens unit having a positive refractive power which does not move for zooming,
wherein, in the fourth lens unit, a front group is a lens system including a lens face which satisfies a relationship of $$h\_bar\_i/h\_i \leq 0.06,$$

among lenses in an optical path from the aperture stop to an image plane, and a rear group is a lens system other than the lens system of the front group, where h_i is an incidence height from an optical axis of an on-axis ray of an i-th lens, which is a thin lens, in paraxial tracking and h_bar_i is an incidence height from an optical axis of an off-axis main light beam of the i-th lens in the paraxial tracking, and wherein the zoom lens satisfies the following conditional expressions:

$$0.420 < dLm/d < 0.710,$$

$$0.630 < \theta Lm < 0.690,$$

$$2.16 \times 10^{-3} < (\theta Rfn - \theta Rfp) / (vRfp - vRfn) < 3.10 \times 10^{-3},$$
and $$0.17 < \phi Rb/\phi Rf < 0.61,$$

where a partial dispersion ratio of a material of a positive lens Lm formed of a material having a highest partial dispersion ratio, which is contained in the rear group, is represented by θLm, a distance from the aperture stop to the image plane is represented by d, a distance from the aperture stop to the positive lens Lm is represented by dLm, an average value of Abbe constants of materials of positive lenses contained in the front group is represented by vRfp, an average value of partial dispersion ratios thereof is represented by θRfp, an average value of Abbe constants of materials of negative lenses contained in the front group is represented by vRfn, an average value of partial dispersion ratios thereof is represented by θRfn, a refractive power of the front group is represented by φRf, and a refractive power of the rear group is represented by φRb.

* * * * *